United States Patent [19]

Schwarzbach et al.

[11] 4,418,333
[45] Nov. 29, 1983

[54] APPLIANCE CONTROL SYSTEM

[75] Inventors: Richard J. Schwarzbach; Manley S. Keeler, both of Naperville; Randy J. Cavaiani, Hanover Park; Michael K. Chapman, Sycamore, all of Ill.

[73] Assignee: Pittway Corporation, Aurora, Ill.

[21] Appl. No.: 271,244

[22] Filed: Jun. 8, 1981

[51] Int. Cl.[3] .................. H04Q 9/00; G06F 15/20; H04B 3/54
[52] U.S. Cl. .................. 340/310 A; 340/825.07; 340/825.22
[58] Field of Search ......... 340/310 A, 825.15, 825.22, 340/309.1, 309.4, 825.06, 825.07, 825.17, 501, 825.52; 307/141; 315/293; 364/104

[56] References Cited

U.S. PATENT DOCUMENTS

| | | | |
|---|---|---|---|
| 3,691,528 | 9/1972 | Calvagna et al. | 340/825.52 |
| 3,815,091 | 6/1974 | Kirk | 340/825 |
| 4,151,515 | 4/1979 | Pease et al. | 340/309.1 |
| 4,156,866 | 5/1979 | Miller | 340/825.06 |
| 4,174,517 | 11/1979 | Mandel | 340/310 A |
| 4,200,862 | 4/1980 | Campbell et al. | 340/310 A |
| 4,217,646 | 8/1980 | Caltagirone et al. | 340/310 R |
| 4,279,012 | 7/1981 | Beckedorff et al. | 340/825.22 |
| 4,308,911 | 1/1982 | Mandl | 340/501 |

Primary Examiner—Donald J. Yusko
Attorney, Agent, or Firm—Dithmar, Stotland, Stratman & Levy

[57] ABSTRACT

An appliance control system includes a central control unit and a plurality of slave units each including a user-programmable microprocessor and respectively plugged into outlet sockets of a power main in a building, appliances being respectively coupled to the slave units. The system permits manual or automatic transmission of command signals and status request signals from the central control unit to individually addressed slave units, and transmission of status signals from the slave units to the central control unit. Certain slave units include lamp dimmers which can be operated either remotely from the central control unit or locally at the slave unit, the microprocessors of these slave units being programmable to remember a predetermined brightness level, so that the lamp can be remotely turned on to that predetermined level. Means are provided for turning the appliance off at the remote appliance site while maintaining the appliance under the control of the central control unit. Means are also provided for reviewing and testing a pre-programmed schedule of command instructions.

33 Claims, 20 Drawing Figures

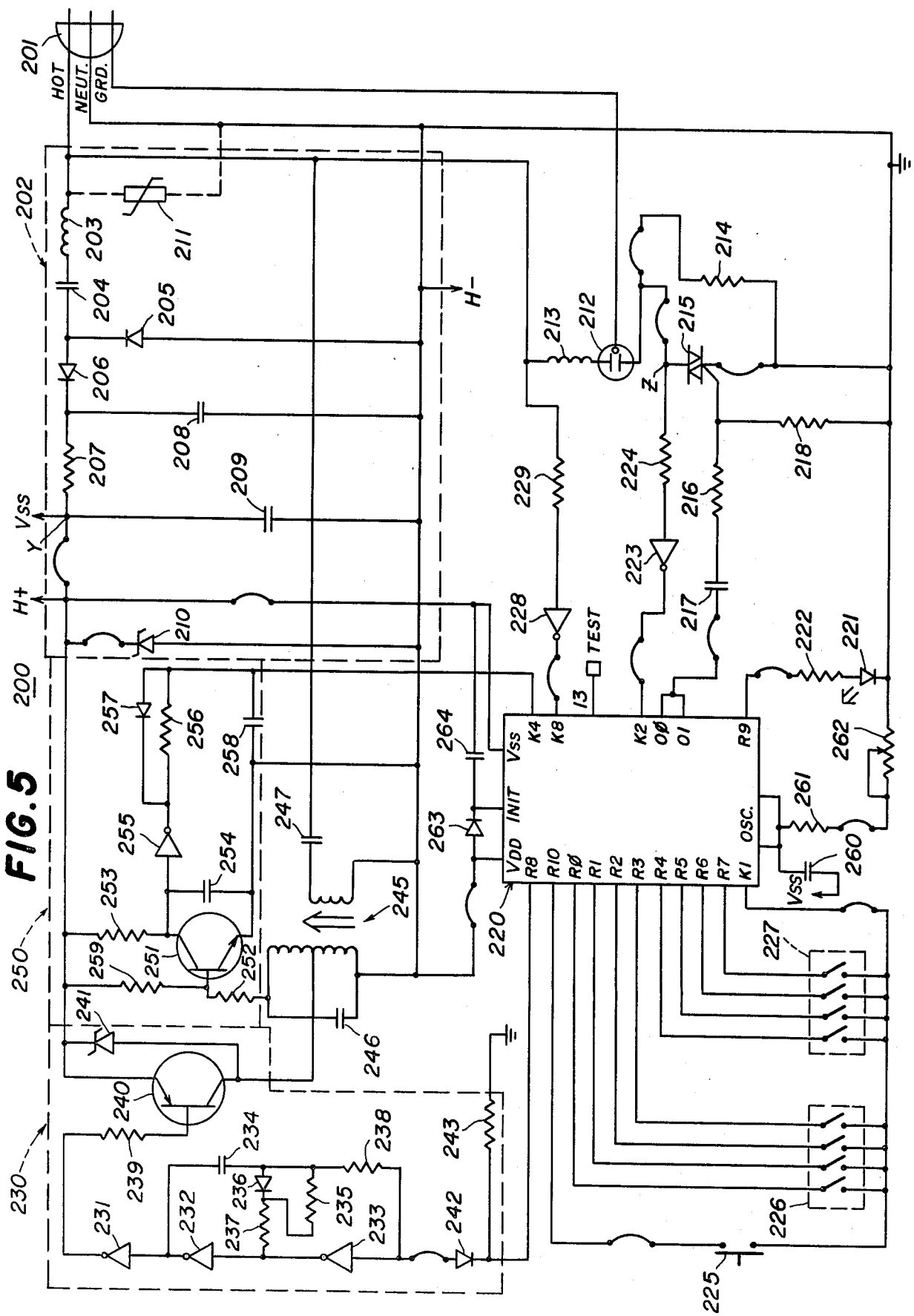

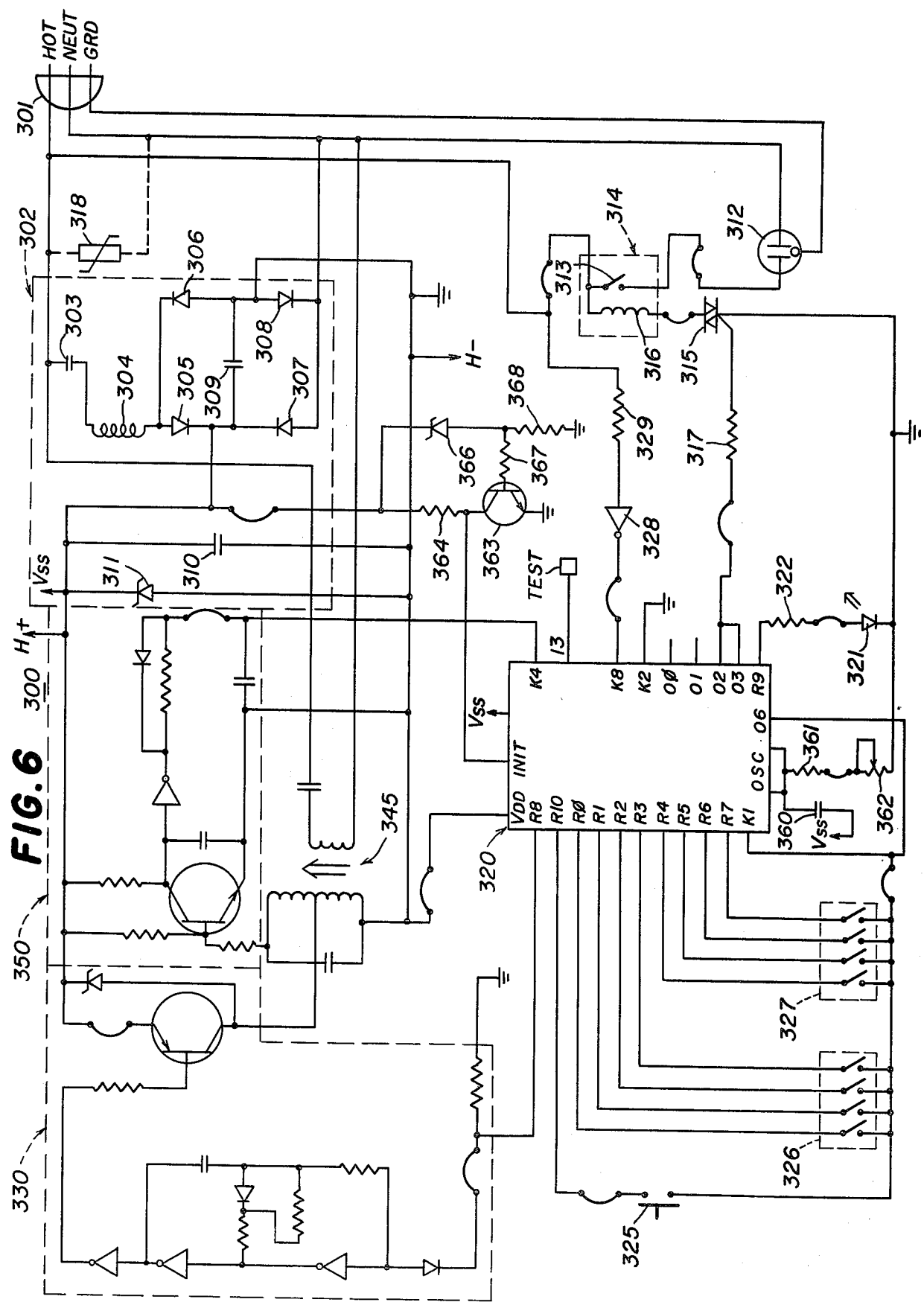

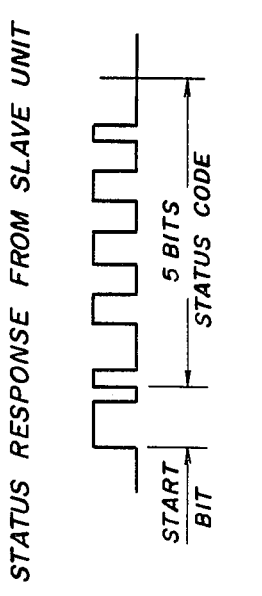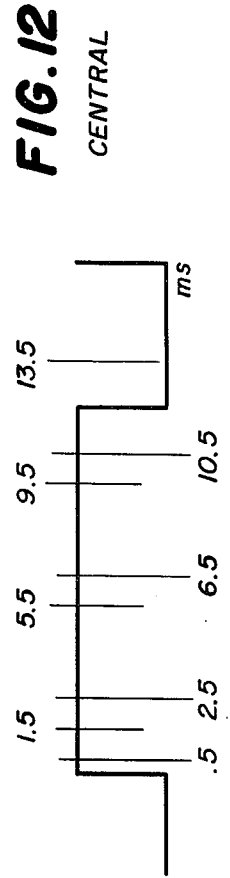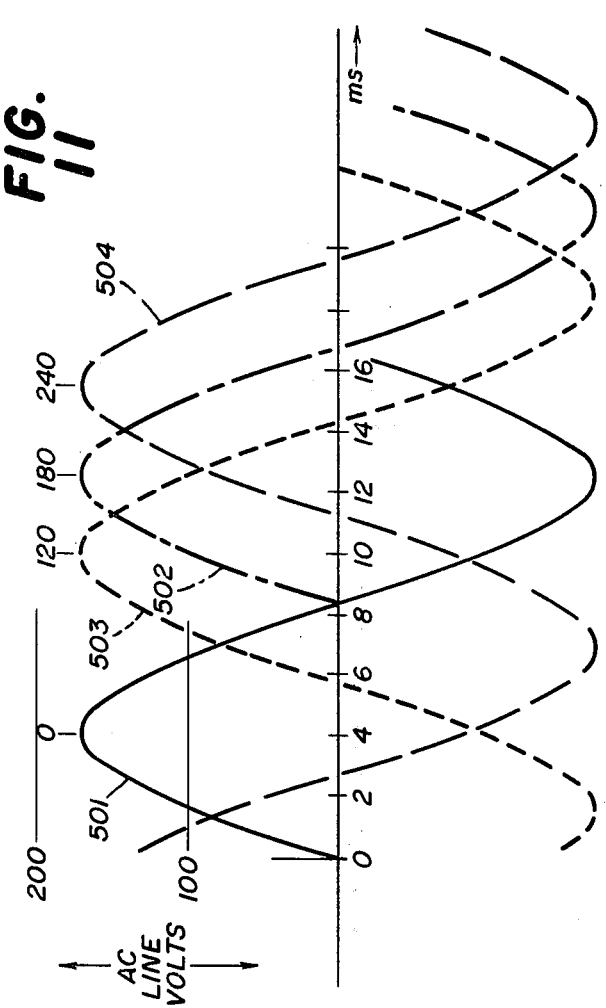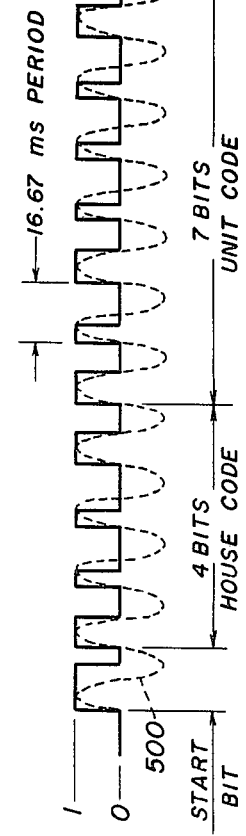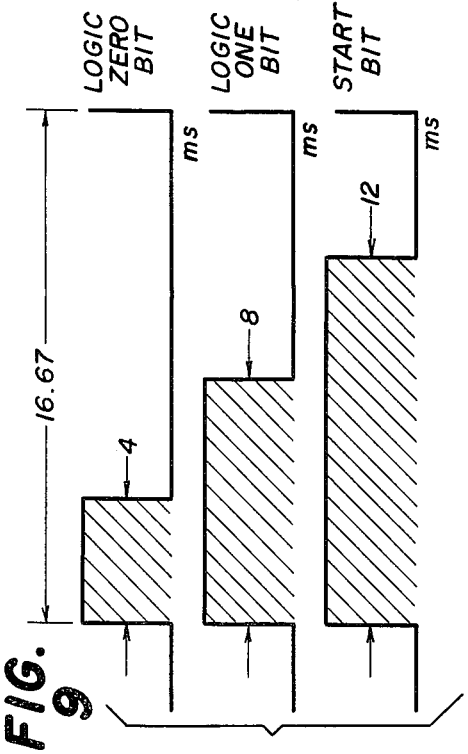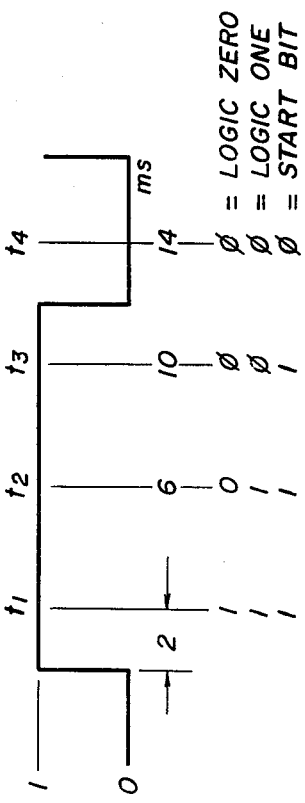

CENTRAL UNIT
MANUAL & AUTO MODES

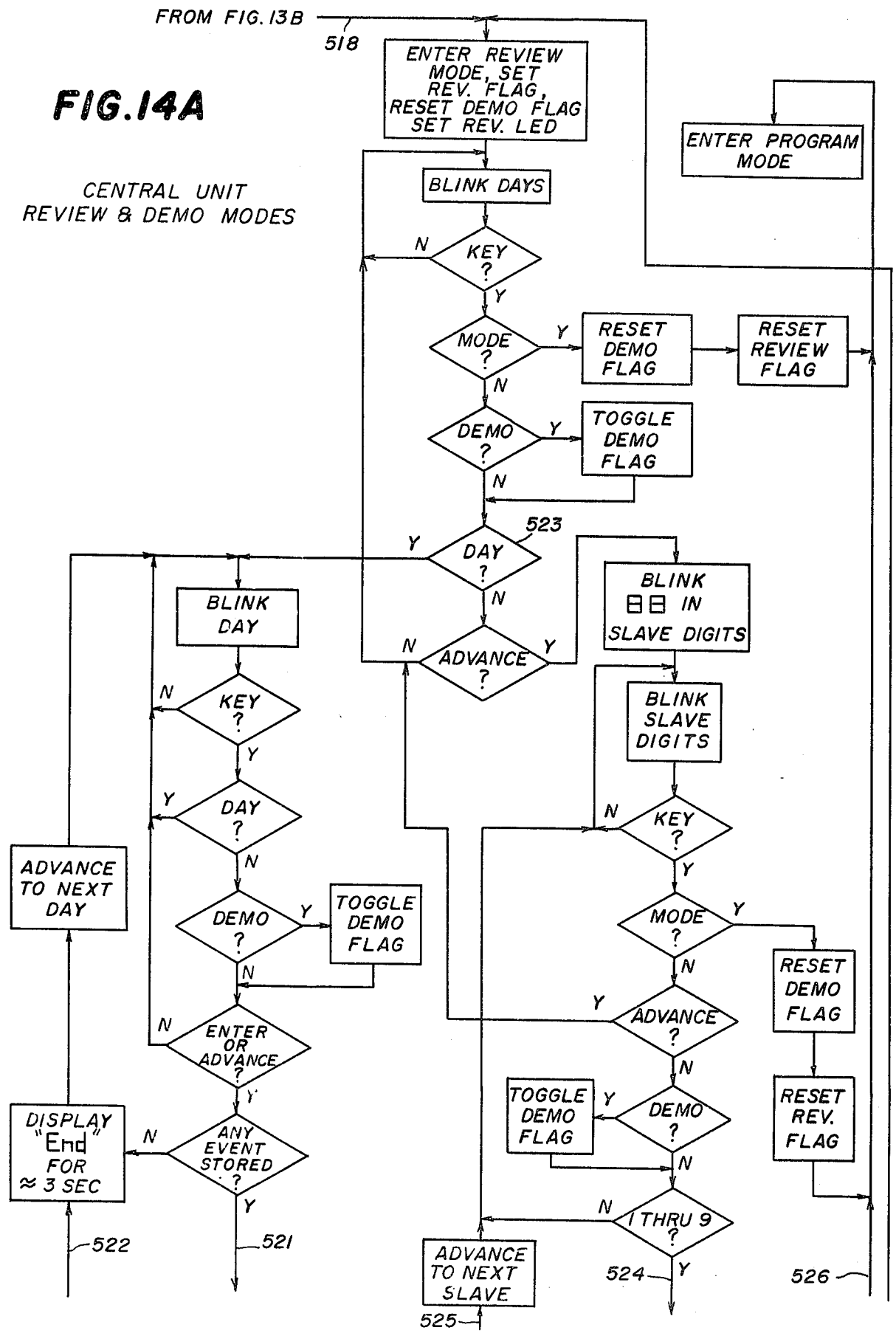

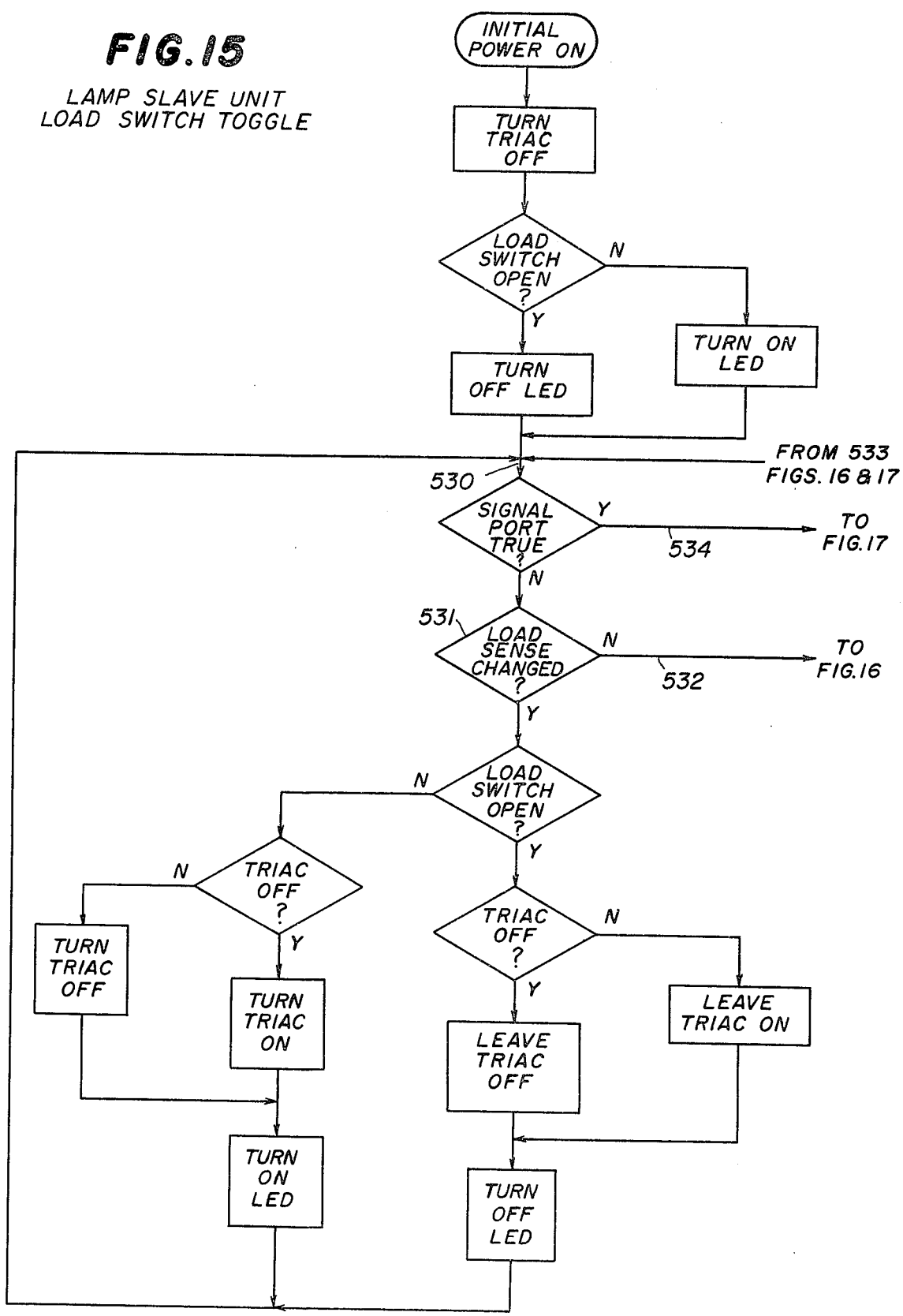

LAMP SLAVE UNIT LOCAL DIMMING

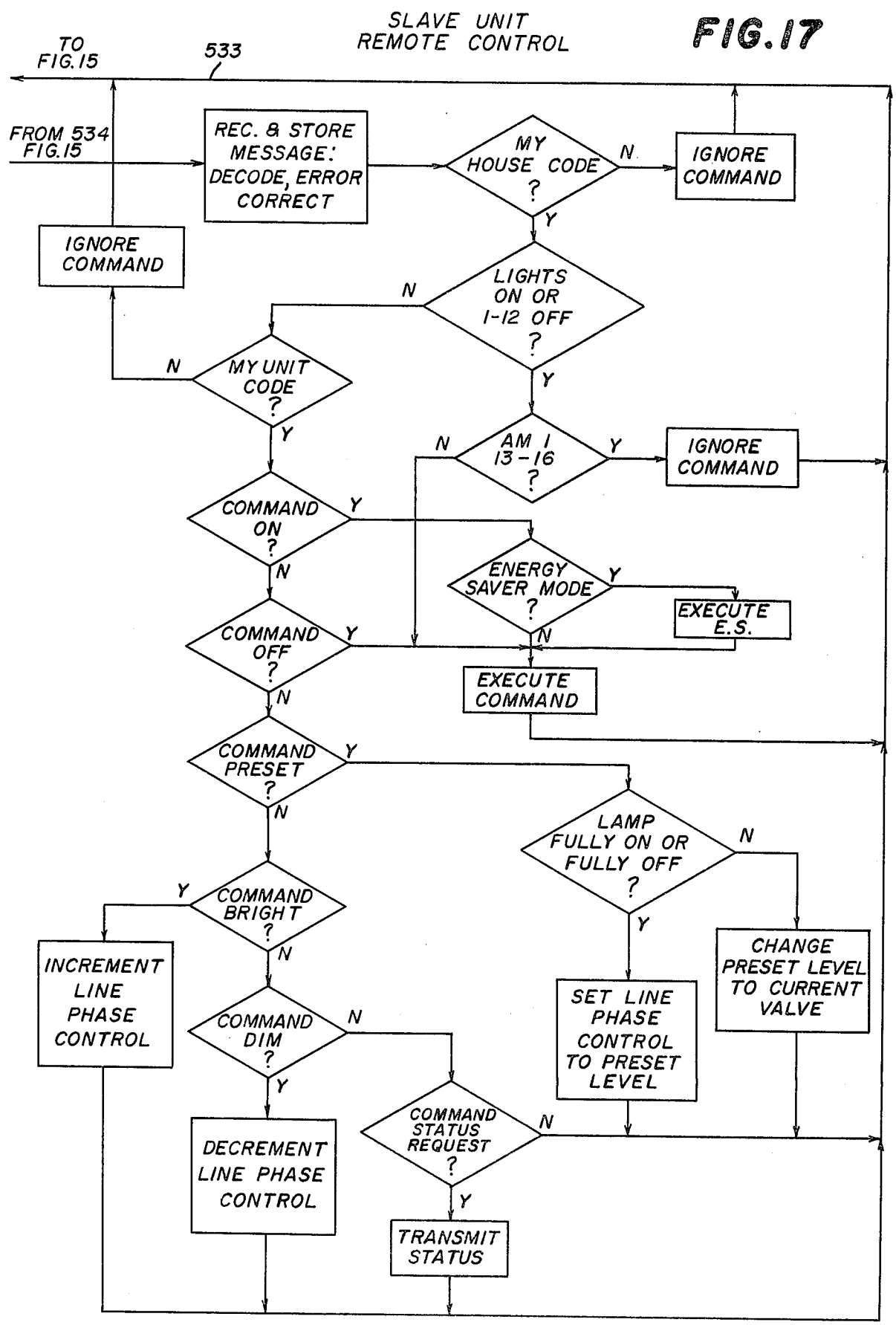
FIG. 17 SLAVE UNIT REMOTE CONTROL

APPLIANCE CONTROL SYSTEM

BACKGROUND OF THE INVENTION

This invention relates to control of electrical appliances within a building, including both remote and local control. In particular, the invention relates to a system which utilizes the common power distribution lines of a building to provide a medium for communication between a central control unit and a plurality of remote slave units respectively adapted to be coupled to appliances to be controlled.

Systems of this type are disclosed, for example, in U.S. Pat. Nos. 4,174,517 and 4,200,862. Such systems typically include a central control unit and a plurality of remote slave units, each of which units includes an integrated circuit microprocessor and is adapted to be plugged into an outlet socket of the domestic electrical power main. Input means are provided on each slave unit for programming its microprocessor with a coded address for that unit and input means are provided on the central control unit for programming its microprocessor and controlling the transmission of command signals to the slave units. In this regard, the central control unit includes a transmitter/modulator and each slave unit includes a receiver/demodulator. Additionally, each slave unit may include a transmitter/modulator and the central control unit may include a receiver/demodulator so that signals indicative of the status of the slave units may be transmitted therefrom to the central control unit.

While such prior systems have generally provided effective remote control of appliances, they have had a number of disadvantages. Thus, certain functions, such as lamp dimming control, could be performed only from the central control unit and could not be executed locally at the appliance. On the other hand, a function which could be controlled at the appliance, such as turning the appliance off at its own switch, would remove that appliance from control by the system. Furthermore, while lamp dimming functions controlled from the central control unit are provided, there is no means for instantaneously turning the lamp on to a predetermined dimmed condition. In order to bring an individual lamp to an intermediate brightness condition, it is necessary to first turn it full on and then run it manually through the dimming operation until the desired brightness level is reached.

Another drawback of the prior art systems is that they provide no means for verifying at the central unit whether a transmitted command has been executed by a slave unit. Furthermore, these systems are capable of being pre-programmed by the user with a number of commands to be automatically executed at predetermined times. The system then automatically transmits the programmed commands at the appointed times. But once a set of commands is loaded into the system memory, there is no means provided for testing the user-entered program to make sure that the commands have been properly stored in the system memory and to verify that they can be properly executed by the system. The only way to determine a defect in the program is to constantly monitor the system until the entire program has been completed and see if it was properly carried out.

SUMMARY OF THE INVENTION

It is a general object of this invention to provide an improved appliance control system for providing communication between a central control unit and remote slave units over common power lines, which system avoids the disadvantages of prior art systems while affording additional structural and operating advantages.

An important object of this invention is to provide a system of the type set forth which permits a remote lamp to be dimmed or brightened either remotely from the central control unit or locally at the slave unit.

It is another object of this invention to provide a system of the type set forth which permis a controlled lamp to be turned on immediately to a predetermined dimmed condition.

Still another object of this invention is the provision of a system of the type set forth, wherein a controlled device can be turned off by the use of its own switch without removing the device from system control.

Another object of this invention is the provision of a system of the type set forth which permits verification that a function command transmitted to a slave unit has been properly executed.

Yet another object of this invention is the provision of a system of the type set forth which can be pre-programmed by the user with a plurality of commands to be automatically executed at predetermined times, and which includes means for accelerating the program to permit review and testing thereof.

In connection with the foregoing object, it is another object of this invention to provide a system of the type set forth wherein, immediately after the transmission of a programmed command message to a slave unit, the central unit automatically interrogates that slave unit as to its status and the slave unit responds with its current status.

It is another object of this invention to provide a central control unit for use in a system of the type set forth.

Still another object of this invention is the provision of slave units for use in a system of the type set forth.

These and other objects of the invention are attained by providing, for example, in a system including a central unit for controlling a remote lamp, a slave unit coupled to the remote lamp, and means providing communication between the central unit and the slave unit, the slave unit including light intensity control means variable among a plurality of intensity levels corresponding respectively to an OFF condition and a maximum intensity condition and a plurality of intermediate intensity conditions of the associated lamp, the central unit including means for transmitting to the slave unit a control signal for operating the light intensity control means, the improvement comprising: means in the central unit for transmitting to the slave unit a preset intensity signal; and processor means in the slave unit operating under stored program control; the processor means including means for sensing the intensity level of the light intensity control means; the processor means including means responsive to the preset intensity signal when the light intensity control means is in either the OFF level or the maximum intensity level for setting the light intensity control means to a predetermined intermediate intensity level.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages, of the invention.

BRIEF DESCRIPTION OF THE DRAWINGS

FIG. 5 is a schematic circuit diagram of the electrical circuit of the lamp slave unit of the appliance control system of FIG. 1;

FIG. 6 is a schematic circuit diagram of the electrical circuit of the appliance slave unit of the appliance control system of FIG. 1;

FIG. 7 is a waveform diagram of a typical command message transmitted from the central cotrol unit of the appliance control system of FIG. 1;

FIG. 8 is a waveform diagram similar to FIG. 7, illustrating a typical status message transmitted from a slave unit to the central control unit;

FIG. 9 is an enlarged wave-form diagram indicating the three types of logic bits utilized in the coding scheme of the present invention;

FIG. 10 is a waveform diagram illustrating the sampling pattern by which a slave unit decodes received message bits;

FIG. 11 is a waveform diagram illustrating various phases of 60 Hz AC power;

FIG. 12 is a waveform diagram similar to FIG. 10, illustrating the sampling pattern by which the central control unit decodes received message bits;

FIGS. 14A and 14B are a program flow chart depicting the operational steps performed by the microprocessor of the central control unit in its REVIEW and DEMO modes of operation; and FIGS. 15, 16 and 17 are program flow charts depicting operational steps performed by the microprocessors of the slave units to accomplish various functions.

DESCRIPTION OF THE PREFERRED EMBODIMENT

Figure 1:
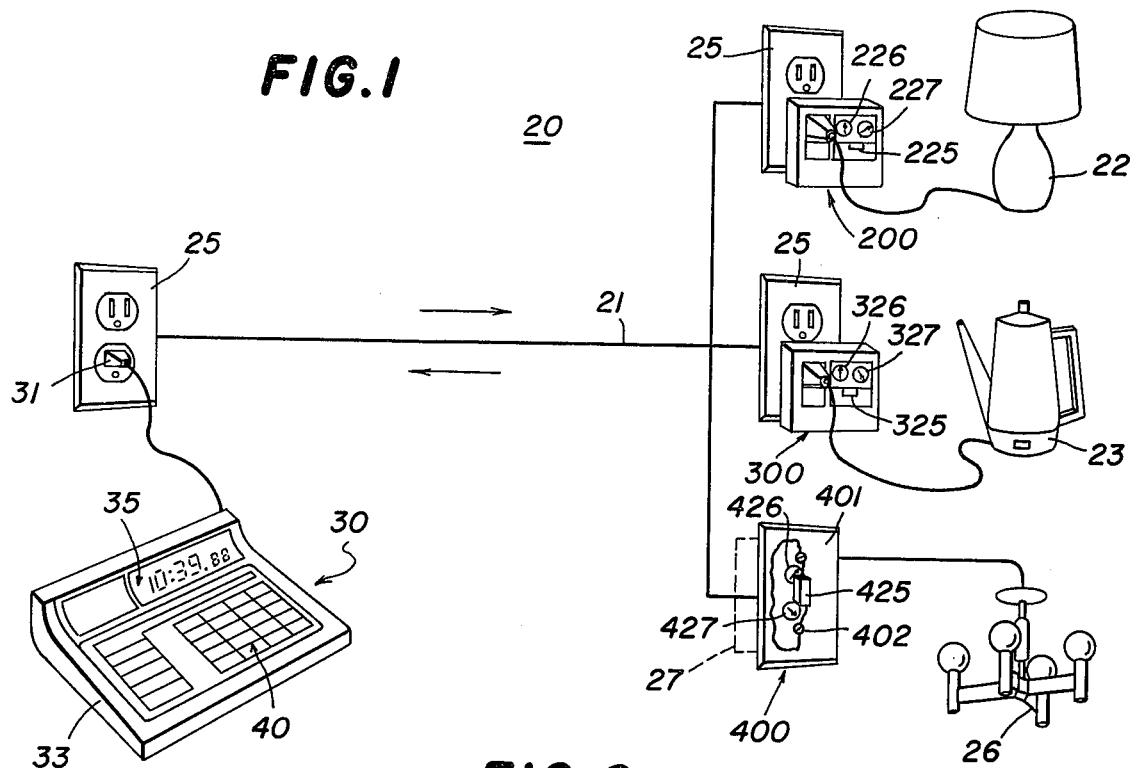
FIG. 1 is a perspective view of an appliance control system constructed in accordance with and embodying the features of the present invention, shown connected to the power distribution lines of a building.

Referring to FIG. 1 of the drawings, there is illustrated an appliance control system, generally designated by the number 20, constructed in accordance with and embodying the features of the present invention. The system 20 is adapted to be coupled to the power lines 21 of a building power distribution system for controlling one or more remote devices, such as a lamp 22, an appliance 23, or a built-in lighting fixture such as the ceiling-mounted fixture 26. More particularly, the system 20 includes a central control unit 30, one or more lamp slave units 200, one or more appliance slave units 300 and one or more wall switch slave units 400. The central control unit 30 is provided with a plug 31 and the slave units 200 and 300 are each provided with plugs 201 and 301 (see FIGS. 5 and 6) for plugging these units into the outlet sockets 25 of the power distribution system. The wall switch slave unit 400 is adapted to be mounted in a wall switch receptacle 27 in place of the wall switch which normally controls the associated light fixture.

Figure 4A:
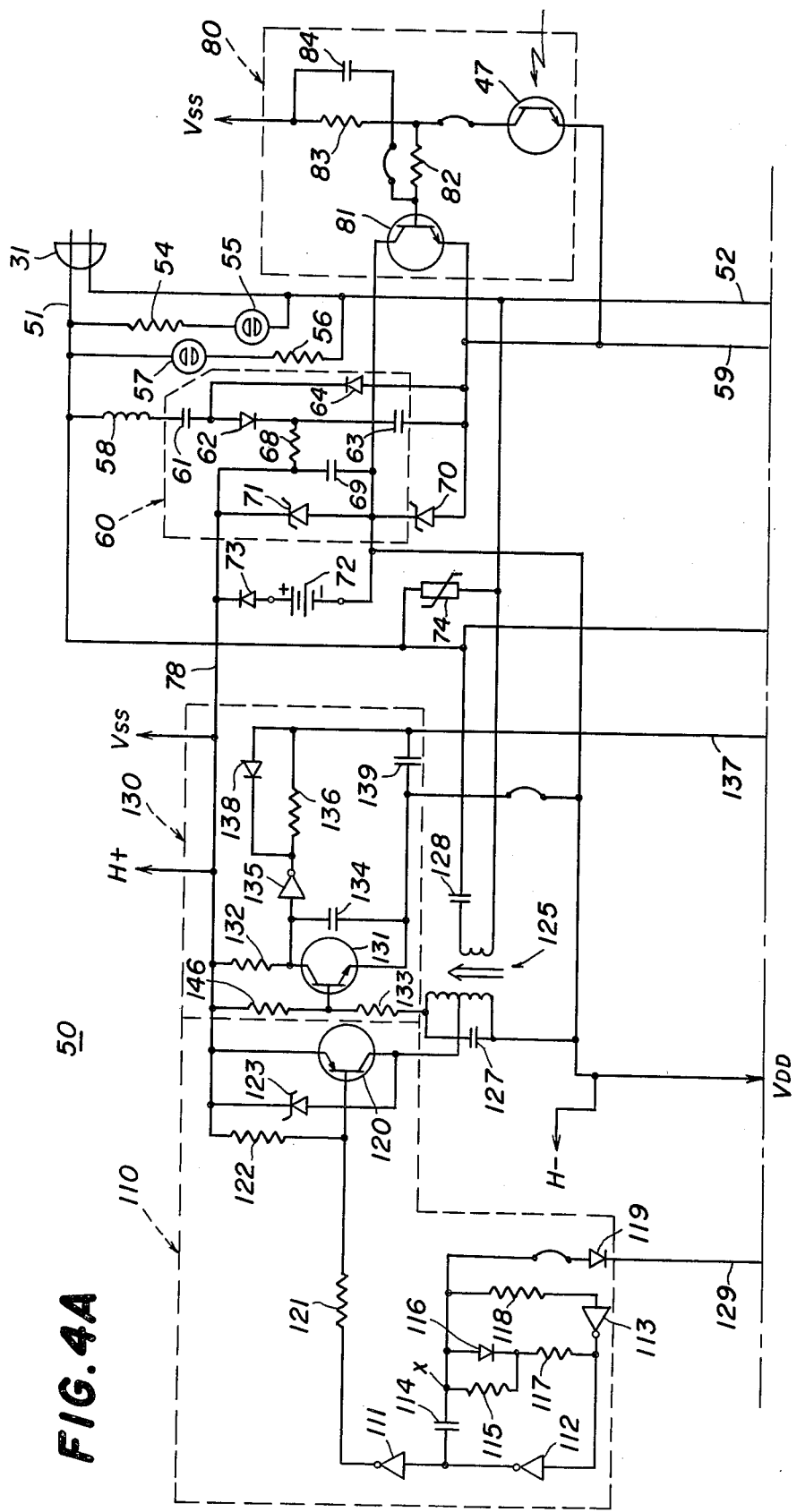
FIGS. 4A and 4B are a schematic circuit diagram of the electrical circuit of the central control unit of the appliance control system of FIG. 1.
Figure 4B:
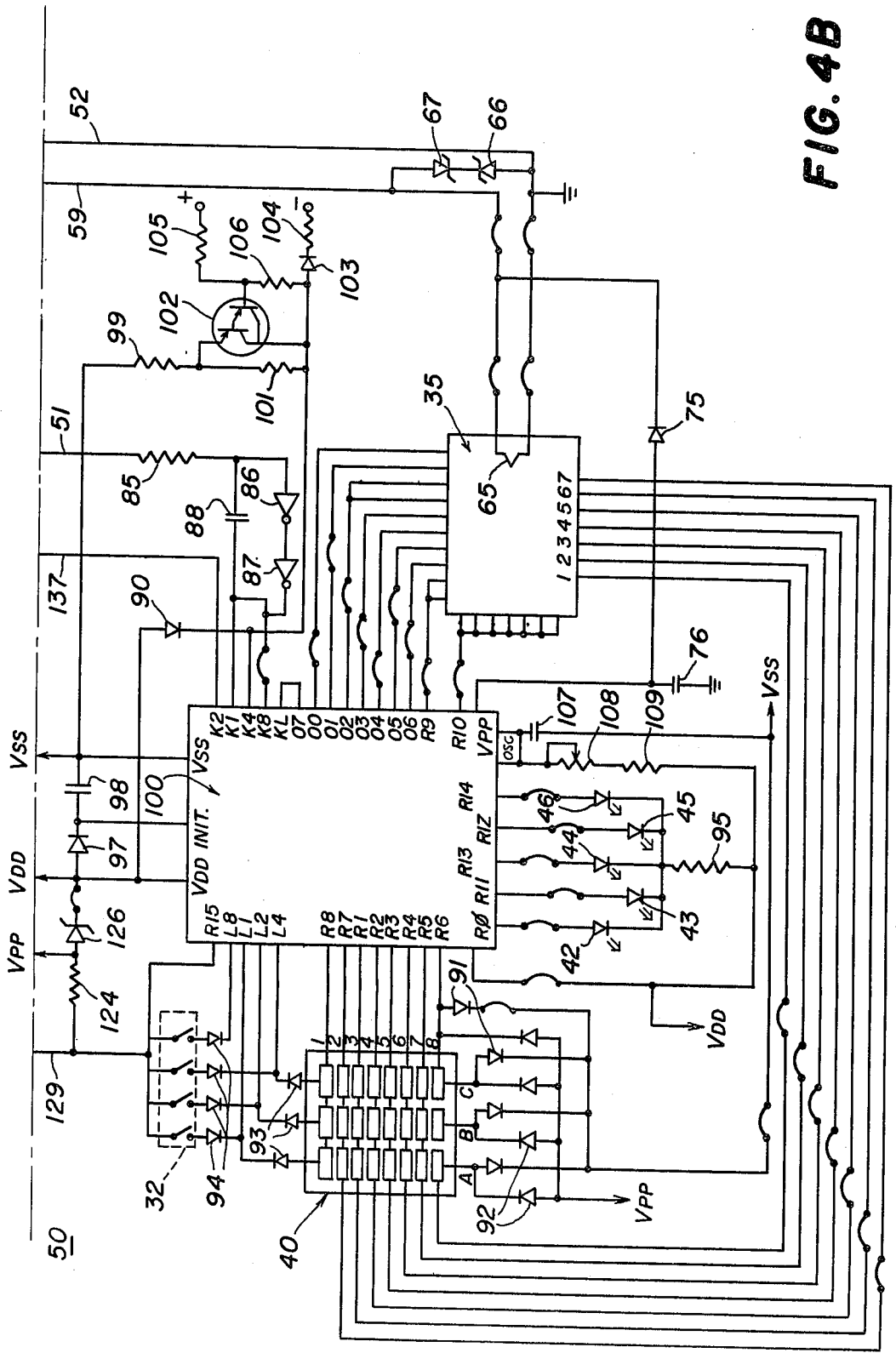

Referring to FIGS. 4A and 4B, the central control unit 30 is provided with an electrical circuit 50 which includes a microprocessor 100. A house code switch 32, preferably in the form of a rotary switch having four contact elements respectively corresponding to the 1's, 2's, 4's and 8's digits of the binary numbering system, is coupled to the microprocessor 100. The house code switch 32 is preferably located on the bottom of the housing 33 of the central control unit 30, and by the use of this switch any one of sixteen different house codes can be programmed into the microprocessor 100. Thus, if more than one system 20 is used in a multiple-occupant building such as an apartment building or an office building, the system can be assigned a unique house code which will not interfere with any other systems in the building. Accordingly, up to sixteen separate systems 20 can be used in a building without interference with one another, as will be explained more fully below.

Figure 3:
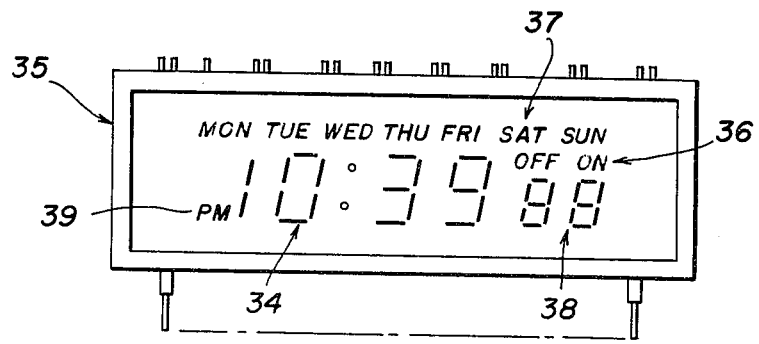
FIG. 3 is an enlarged plan view of the display panel of the central control unit of the appliance control system of FIG. 1.

The central control unit 30 also includes a display panel 35 which is coupled to a microprocessor 100 and which is preferably a seven-character vacuum-tube fluorescent display, in which numerals and/or letters are created with a standard seven-segment character. Referring to FIG. 3, the display includes an array of five large characters 34 to indicate the time-of-day and certain words, and an array of two small characters 38 to indicate the slave unit numbers. Each of the seven characters is also provided with a day designation, as at 37, to provide a day-of-the-week display. The two small characters 38 additionally respectively include ON and OFF designations 36, and the first large character 39 also includes a PM designation. Thus, it can be seen that a few of the characters have as many as nine segments. The display panel 35 is a multiplex type display in which all of the corresponding segments of each character are wired in common. Each character is individually selected by one of the conductors designated 1 through 7. The characters are time multiplexed by the microprocessor 100, which also handles all of the decoding and time-sharing process of the display panel 35.

Figure 2:
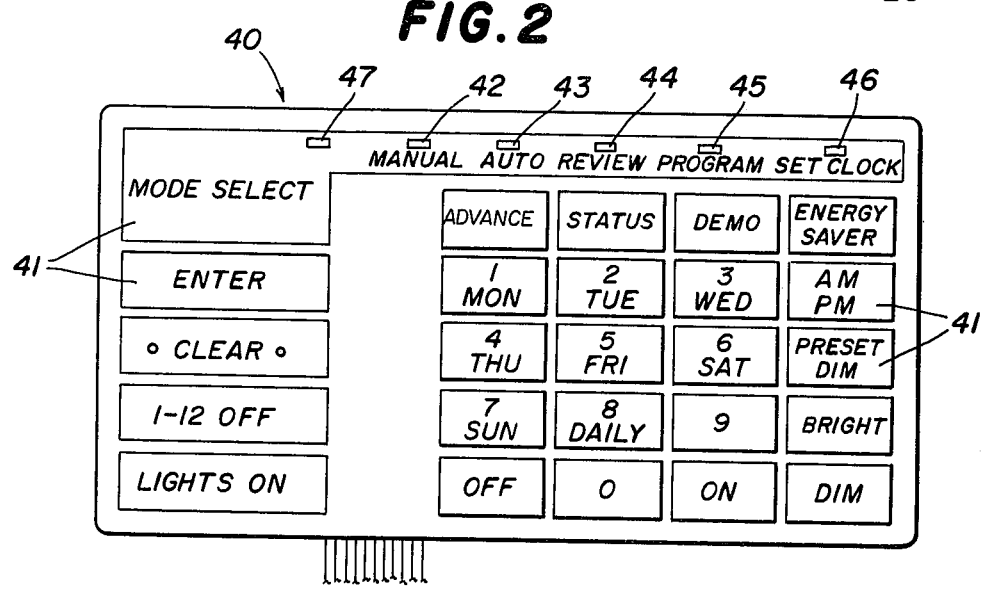
FIG. 2 is an enlarged plan view of the keyboard of the central control unit of the appliance control system of of FIG. 1.

The central control unit 30 also includes a keyboard 40 which is coupled to the display panel 35 and to the microprocessor 100. Referring to FIG. 2, the keyboard 40 is preferably a membrane-switch key pad comprising a plurality of keys 41, each provided with translucent indicia to indicate the function of that key. The keyboard 40 is connected as a 3×8 matrix, with its row pins 1 through 8 connected to corresponding microprocessor output terminals. During normal standby operation, the microprocessor 100 sequentially drives its output terminals R1 through R8 to a high level for about 0.75 ms. All eight pins are scanned once during each cycle of AC line voltage for simultaneously driving the keyboard rows 1 through 8 and the display panel character terminals 1 through 7. During the time that a keyboard row pin is held high, the microprocessor 100 looks at its input wires L1–L8 to determine whether a key is closed. When the key closure is detected, the microprocessor 100 takes the appropriate action after the end of that keyboard scan. The arrangement of the keys 41 on the 3×8 matrix is set forth in the following chart:

| A | B | C | |
|---|---|---|---|
| CLEAR | 1-12 OFF | LIGHTS ON | 1 |
| ENTER & ADVANCE | STATUS | DEMO | 2 |
| MODE SELECT | 1/MON | 2/TUE | 3 |
| 3/WED | AM/PM | ENERGY SAVER | 4 |
| 4/THU | 6/SAT | 5/FRI | 5 |
| PRESET DIM | BRIGHT | 9 | 6 |
| 7/SUN | 0 | 8/DAILY | 7 |
| OFF | ON | DIM | 8 |

The central control unit 30 also includes a plurality of LED's which are coupled to the microprocessor 100 and are mounted immediately beneath the keyboard 40 so as to shine respectively through apertures therein, these LED's respectively indicating the various modes in which the central control unit 30 may operate. More specifically, an LED 42 indicates a MANUAL mode, an LED 43 indicates an AUTO or automatic mode, an LED 44 indicates a REVIEW mode, an LED 45 indicates a PROGRAM mode, and an LED 46 indicates a SET CLOCK mode. Also mounted immediately beneath the keyboard 40 in registry with an aperture therethrough is a photocell which is preferably in the form of a phototransistor 47, for a purpose to be explained more fully below.

The plug 31 is a two-prong plug, the prongs being respectively connected to a live conductor 51 and a grounded neutral conductor 52. Connected in series across the conductors 51 and 52 is a resistor 54 and a neon lamp 55. Also connected in series across the conductors 51 and 52 is a resistor 56 and a neon lamp 57. The neon lamps 55 and 57 are mounted beneath the membrane of the keyboard 40 for providing backlighting of the translucent indicia thereon. The conductor 51 is connected through a choke coil 58 to a power supply 60, which is in turn connected by a conductor 59 to the display panel 35. The power supply 60 includes a capacitor 61, a diode 62 and a capacitor 63, all connected in series with the choke coil 58 across the conductors 51 and 59. A diode 64 is connected in parallel with the diode 62 and the capacitor 63. The conductor 59 is connected to one terminal of the filament 65 of the display panel 35, the other terminal of which is connected to the neutral conductor 52. Back-to-back Zener diodes 66 and 67 are connected across the display filament 65. A resistor 68, a capacitor 69 and a Zener diode 70 are connected in series between the cathode of the diode 62 and the conductor 59. A Zener diode 71 is connected in parallel with the capacitor 69. Connected in parallel with the Zener diode 71 is the series combination of a battery 72 and a diode 73. A varistor 74 may be connected across the AC line conductors 51 and 52 to clamp high-energy spikes which might appear on the AC line and damage the central control unit 30. The $V_{PP}$ supply output terminal of the microprocessor 100 is connected by a diode 75 to the conductor 59 and via a capacitor 76 to ground.

The capacitor 61 drops the 120-volt line voltage down to a more usable voltage. During the positive half-cycle of the AC line voltage, current flows through the capacitor 61, the diode 62 and the capacitor 63 and then through the display filament 65 to the neutral conductor 52. During the negative half-cycle of the line voltage, current is in the opposite direction from the neutral conductor 52 through the display filament 65, the diode 64 and the capacitor 61. When the capacitor 63 has been charged to a potential of about 16 volts, the Zener diode 70 begins to conduct and current flows through the resistor 68, the capacitor 69 and the Zener diode 70, returning to the neutral conductor 52 through the display filament 65. Thus, the Zener diode 70 provides the $V_{DD}$ supply voltage of approximately +16 volts, which is connected to the $V_{DD}$ input terminal of the microprocessor 100. When the capacitor 69 has been charged to about 9.1 volts, the Zener diode 71 will begin to conduct and will maintain the $V_{DD}$ to $V_{SS}$ potential of about 9 volts. This 9-volt supply is riding on top of the 16-volt supply of the Zener diode 71, whereby the $V_{SS}$ supply, provided at conductor 78, is about +25 VDC, which supply is riding on top of the approximately 3 volts AC which is present across the display filament 65. Most of the circuitry in the central control unit 30 operates between the $V_{DD}$ and $V_{SS}$ potentials. These stacked power supplies are necessary because the vacuum-tube fluorescent display of the display panel 35 requires 30 volts between anode and filament in order to operate brightly, but the microprocessor 100 is restricted to not more than 10 volts across itself, except for the O outputs.

A negative voltage of about −5 volts with respect to neutral is developed by the capacitor 76. This negative voltage is the return point for pull-down resistors on the microprocessor 100 outputs. Since these outputs are pulled down to −5 volts, but can go as high as +25 volts, the display panel 35 is actually driven at its anodes and grids by swings of approximately 30 volts, which is sufficient to give adequate brightness and also to insure cutoff of blank display elements. The battery 72 is simply a backup supply and serves to protect programs stored in the memory of the microprocessor 100 in the event of an AC power failure. The Zener diodes 66 and 67 serve to suppress start-up transients that might appear across the display filament 65.

The brightness of the display panel 35 is controlled by a display dimmer, generally designated by the numeral 80, which includes a transistor 81 having its emitter connected to the conductor 59 and its collector connected to the $V_{DD}$ supply. The base of the transistor 81 is connected through resistors 82 and 83 to the $V_{SS}$ supply, a capacitor 84 being connected in parallel therewith. The junction between the resistors 82 and 83 is connected to the collector of the phototransistor 47, the emitter of which is connected to the conductor 59.

As indicated above, the phototransistor 47 is so mounted on the central control unit 30 that room light can fall through an aperture in the keyboard 40 and illuminate the surface of the phototransistor 47. In a brightly lit room the phototransistor 47 will be saturated, with its collector being very close to ground potential. This turns off transistor 81. In this case, the microprocessor 100 is supplied with the $V_{SS}$ potential of approximately +25 volts so as to drive the display panel 35 to a sufficient brightness to be visible in the relatively bright ambient light. When the ambient light is reduced or disappears, phototransistor 47 shuts off and its collector rises to $V_{SS}$. Transistor 81 is now turned on by current through the resistors 82 and 83. When transistor 81 saturates, it effectively short-circuits the Zener diode 70. Since the microprocessor 100 is floating on top of Zener diode 70, its output swing is now decreased to about 10 volts from the previous 25, which substantially reduces the brightness of the display panel 35.

The AC conductor 52 is connected to the microprocessor 100 through an inverter amplifier, which includes the series combination of a resistor 85 and inverter sections 86 and 87 of an integrated-circuit hex inverter, the supply terminals of which are connected to the $V_{SS}$ and $V_{DD}$ supplies, as indicated at H+ and H−. The output of the inverter section 87 is connected to the K1 and K8 input terminals of the microprocessor 100. A capacitor 88 is connected in parallel with the inverter sections 86 and 87. The purpose of this inverter amplifier is to convert the AC line voltage to a square wave form. The capacitor 88 provides AC positive feedback around the amplifier in order to obtain very fast transitions of the square wave. This squared up 60 Hz signal is used as the timing reference for data communication to and from the central control unit 30, as will be explained more fully below.

The column terminals and the row 8 terminal of the keyboard 40 are connected by diodes 91 to the $V_{SS}$ supply and by diodes 92 to a $V_{PP}$ supply. The diodes 91 and 92 are connected so as to protect the microprocessor input terminals from damage in the event of a static discharge between the operator and the keyboard 40. Diodes 93 are connected between the column terminals of the keyboard 40 and the input terminals L1, L2 and L4 of the microprocessor 100 to provide isolation of the keyboard conductors from one another. In like manner, diodes 94 provide isolation of the elements of the house code switch 32 from one another. The $V_{DD}$ supply is connected through a resistor 95 to the cathodes of the LED's 42 through 46.

The $V_{DD}$ and $V_{SS}$ supplies are respectively connected to corresponding input terminals of the microprocessor 100. Connected in series between these supplies are a diode 97 and a capacitor 98, the junction therebetween being connected to an INIT input terminal of the microprocessor 100. The diode 97 and the capacitor 98 constitute an initializing circuit for the microprocessor 100. When power is first applied, the rising edge of the $V_{SS}$ supply is coupled through the capacitor 98 to the INIT terminal of the microprocessor 100 for resetting it and starting its operation at the beginning of its stored program. The diode 97 serves to discharge the capacitor 98 when the power drops, thereby preparing it for the next start-up pulse.

Means are provided for interface between the central control unit 30 and an outside unit, such as an ultrasonic burglar alarm or other type of alarm system. The $V_{SS}$ supply is connected through a resistor 99 to the emitter of a Darlington transistor 102 which has its collector connected to the K4 input terminal of the microprocessor 100. A resistor 101 is connected across the emitter-collector junction of the transistor 102. A diode 103 and a resistor 104 are connected in series between the collector of the transistor 102 and one of the interface input terminals, while the base of the transistor 102 is connected to the other interface input terminal through a resistor 105. A resistor 106 is connected across the base-collector junction of the transistor 102.

If nothing is connected to the two interface terminals (which are perferably provided on the back of the central control unit 30), then the Darlington transistor 102 will be turned on, thereby driving terminal K4 of the microprocessor 100 to a logic high state. This is the normal quiescent condition of terminal K4. If a voltage of 5.5 volts or more is applied to the interface terminals with the polarity indicated, the transistor 102 will be turned off, causing the terminal K4 of the microprocessor 100 to drop to a logic low state. This is the signal that tells the microprocessor 100 that some external device is signaling alarm, thereby causing the microprocessor 100 to respond in a predetermined manner such as by transmitting an "ON" command to certain slave units so as to flood a house with light and actuate a remote siren or dialer, as in the case for a burglar alarm. A diode 90 is connected between the $V_{DD}$ supply and the K4 terminal of the microprocessor 100 to insure that the terminal K4 is not pulled lower in voltage than $V_{DD}$.

The $V_{SS}$ supply is connected through a capacitor 107 to the oscillator input terminals of the microprocessor 100, these terminals also being connected through a variable resistor 108 and a resistor 109 to the $V_{DD}$ supply. The capacitor 107 and the resistors 108 and 109 work with an internal oscillator circuit of the microprocessor 100, the resistor 108 being adjustable to provide the exactly 500 KHz clock frequency required by the microprocessor 100.

The central control unit 30 also includes a transmitter/modulator, generally designated by the numeral 110, for transmitting signals to the remote slave units 200, 300 and 400. The transmitter/modulator 110 has an inverter oscillator which includes three inverter sections 111, 112 and 113 of the hex inverter. Connected in parallel with the inverter section 112 is the series combination of a capacitor 114, a resistor 115 and a resistor 117, a diode 116 being connected in parallel with the resistor 115. A resistor 118 is connected between the input of the inverter section 113 and a node X at the junction between the capacitor 114 and the resistor 115. A diode 119 has its anode connected to the node X and its cathode connected to the R15 output terminal of the microprocessor 100 via conductor 129. The output of the inverter section 111 is connected via a resistor 121 to the base of a transistor 120, the emitter of which is connected to the $V_{SS}$ supply. A resistor 122 is connected across the base-emitter junction of the transistor 120 while a Zener diode 123 is connected across the emitter-collector junction. The collector of the transistor 120 is connected to the center tap of a winding of a line coupling transformer, generally designated by the numeral 125.

The inverter oscillator is essentially a relaxation oscillator with a time constant established by the capacitor 114 and the resistor 115. Diode 116 is used to alter the duty cycle of the resulting square wave. The last inverter section 111 simply inverts the oscillator wave form to proper polarity to drive the transistor 120. In standby condition the microprocessor output terminal R15 is at a logic low and diode 119 conducts, thereby holding its anode and the input of the inverter section 113 low to maintain the oscillator off. In this condition the output of the inverter section 113 is high, the output of the inverter section 112 is low and the output of the inverter section 111 is high, which shuts off the transistor 120. When the microprocessor output terminal R15 goes high, the diode 119 does not conduct and the input to the inverter section 113 goes high, its output goes low and the output of the inverter section 111 goes low, turning on the transistor 120. The node X is driven higher and then decays toward ground as the capacitor 114 discharges through the diode 116 and the resistor 117. When the node X has dropped to a logic zero, the output of the inverter section 113 is switched high, driving the output of the inverter section 112 low and pulling node X momentarily below ground. The output of the inverter section 113 now pushes current through the resistors 117 and 115 and the capacitor 114 toward the output of the inverter section 112, and the node X moves toward a logic high as the capacitor 114 charges. When the node X and the input of the inverter section 113 reach a logic high, the output of the inverter section 113 is switched low and the cycle repeats.

The resulting rectangular wave has a 20% duty cycle. The inverter section 111 inverts this waveform, and the resulting signal is a rectangular waveform which drives the resistor 121 high for approximately 80% of the cycle and pulls it to a low level for the remaining 20%. This duty cycle represents an optimum compromise between maximum power output and overall transmitter efficiency. When the resistor 121 is driven low, it turns on the transistor 120. The base bias resistor 122 is used to prevent spurious oscillation during power-up of the circuitry. The Zener diode 123 is used to suppress transients which result when the central control unit 30 is initially plugged into the AC line. The frequency of the inverter oscillator is 150 KHz, this carrier wave being pulse-width modulated by the microprocessor 100 with the coded signals to be transmitted, in a manner described more fully below. The $V_{PP}$ supply is connected to the conductor 129 through a resistor 124 which is used to pull down the terminal R15 of the microprocessor 100 to the negative $V_{PP}$ supply. This helps to insure the shutoff of the 150 KHz oscillator. A Zener diode 126 is connected between the $V_{PP}$ and $V_{DD}$ supplies for suppressing large transients which can occur when power is first applied to the central control unit 30.

The output of the transmitter/modulator 110 at the collector of the transistor 120 is connected to the AC line through the coupling transformer 125. More particularly, the transformer 125 has one winding connected across the AC line through capacitor 128, and another center-tapped winding having the tap connected to the collector of the transistor 120 and one end terminal connected to the $V_{DD}$ supply. This tapped winding is tuned to 150 KHz by a capacitor 127. During transmission by the transmitter/modulator 110, the coupling transformer 125 is used to step up the impedance of the AC line, which is approximately 15 ohms at 150 KHz, by a factor of roughly 4. Thus, the collector of the transistor 120 sees a load of about 60 ohms, the waveform at this collector being essentially a sinusoid of 18 volts peak-to-peak, averaging 0. The output of the transformer 125 delivers about 5 to 6 volts peak-to-peak, through the coupling capacitor 128 into the 15-ohm line impedance.

The central control unit 30 also includes a receiver/demodulator, generally designated by the numeral 130, for receiving and demodulating signals from the AC line. The receiver/demodulator 130 includes a transistor 131 having its collector connected to the $V_{SS}$ supply through a resistor 132, and having its base connected through a resistor 133 to the other end terminal of the tapped winding of the coupling transformer 125. A capacitor 134 is connected across the collector-emitter junction of the transistor 131, and the collector is connected through an inverter section 135, a resistor 136 and a conductor 137 to the K2 input terminal of the microprocessor 100. A diode 138 is connected in parallel with the resistor 136, and a capacitor 139 is connected between the conductor 137 and the $V_{DD}$ supply. An optional resistor 146 may be connected between the $V_{SS}$ supply and the base of the transistor 131.

In operation, if a 150 KHz carrier signal is present on the AC line, it is applied through the coupling capacitor 128 to the untapped winding of the transformer 125, which operates to amplify this voltage by a factor of 37, providing about a 30 dB voltage gain across the transformer 125 in the receive mode. This stepped-up voltage is applied through the resistor 133 to the base of the transistor 131, which further amplifies the sinusoidal 150 KHz signal, and acts with the collector resistor 132 and the filter capacitor 134 to produce at the collector a logic zero signal which persists for the duration of the carrier bit envelope. This logic zero signal is inverted by the inverter section 135 and applied through the resistor 136 to the input terminal K2 of the microprocessor 100. The resistor 136 and the capacitor 139 also operate to apply an approximately 0.5 ms time constant to the rising edge of each bit, this wave shaping serving to improve noise immunity of the receiver circuit. The diode 138 serves to achieve a rapid transition of the detected bit from a logic one level to a logic zero level, i.e., it provides a sharp trailing edge, which is also advantageous in noise rejection.

Referring now to FIG. 5 of the drawings, the lamp slave unit 200 includes a three-prong plug 201 which is mounted on the back of the unit housing. The plug 201 is coupled to a power supply 202. More specifically, the hot wire of the plug 201 is connected through a choke coil 203 and a capacitor 204 to the cathode of a diode 205 and the anode of a diode 206, the anode of the diode 205 being connected to the neutral pin of the plug 201. The cathode of the diode 206 is connected through a resistor 207 to a node Y at which a $V_{SS}$ supply is developed, and is connected through a capacitor 208 to the neutral pin of the plug 201. The node Y is also connected to the common pin through a capacitor 209, a Zener diode 210 being connected in parallel with the capacitor 209.

The capacitor 204 and the diodes 205 and 206 constitute a peak-to-peak rectifier circuit which charges the capacitor 208. The resistor 207 and the capacitor 209 comprise the output filter of this power supply and the Zener diode 210 regulates the output voltage of the $V_{SS}$ supply to 9.1 volts. The choke coil 203 serves to prevent the power supply 202 from shorting the 150 KHz carrier. A varistor 211 may be connected across the AC line to clamp high-energy spikes which might appear on the AC line and damage the slave unit 200.

The hot pin of the plug 201 is also connected to one terminal of a three-terminal output receptacle 212 through a choke coil 213, the ground terminal of the receptacle 212 being connected to the ground pin of the plug 201. The receptacle 212 is mounted at the front of the lamp slave unit 200 and is adapted to receive the plug of an associated lamp to be controlled. The other terminal of the receptacle 212 is connected to the common pin of the plug 201 through the parallel combination of a resistor 214 and a triac 215. The gate electrode of the triac 215 is connected through a resistor 216 and a capacitor 217 to the O0 and O1 output terminals of a microprocessor 220, and is connected through a resistor 218 to the common pin of the plug 201.

The triac 215 is connected in a conventional phase control circuit configuration. When the triac 215 is turned on by a gate pulse, line current flows through the choke coil 213 and the lamp plugged into the receptacle 212 and then through the triac 215 back to the neutral line. In order to provide different intensity levels in the lamp, the microprocessor 220 issues gate trigger impulses at its O0 and O1 output lines at different times in the AC line cycle, depending upon the desired brightness. The lamp slave unit 200 is capable of providing sixteen different levels of brightness ranging from fully off to about 98% on. Preferably, these power levels or trigger points are not spaced in equal time increments across the AC half-cycle, but are empirically selected to give the appearance of equal steps of brightness as the dimming or brightening function is operated continuously. At any level of brightness higher than off, the microprocessor 220 emits trigger pulses at the appropriate point in the AC phase. These trigger pulses are rectangular, going positive for approximately 750 ms and then returning to ground. Capacitor 217 differentiates these pulses, giving a positive gate current spike on the rising edge of the pulse and a negative gate drive on the trailing edge of the pulse. Resistor 216 limits the current magnitude of the gate pulse and resistor 218 insures that the triac 215 remains off until triggered by the microprocessor 220.

Connected in series between the R9 output of the microprocessor 220 and neutral are an LED 221 and a resistor 222. Connected in series between the K2 input terminal of the microprocessor 220 and the junction between the receptacle 212 and the triac 215 are an inverter 223 and a resistor 224, the inverter 223 preferably being a section of an integrated-circuit hex inverter, which has its supply terminals respectively connected to the $V_{SS}$ supply and the neutral line, as indicated at H+ and H−. A pushbutton control switch 225 is connected between the R10 output terminal and the K1 input terminal of the microprocessor 220. The K1 input terminal of the microprocessor 220 is also connected through a four-element house code selector switch 226 to the R0 through R3 output terminals of microprocessor 220, and through a four-element unit code selector switch 227 to the R4 through R7 output terminals of the microprocessor 220. The switches 226 and 227 are preferably rotary switches and are mounted on the front of the lamp slave unit 200, as illustrated in FIG. 1. The actuator button for the control switch 225 is also mounted on the front of the lamp slave unit 200 and is formed of a transparent or translucent material.

During normal operation of the lamp slave unit 200, the house code switch 226 and the unit code switch 227 are not scanned. Only after a message has been received and decoded by the microprocessor 220, does it read the house code and unit code switches 226 and 227, scanning the contacts thereof by the output terminals R0–R7, to determine whether it should act on the received instruction, as will be explained more fully below. The LED 221 is located behind the translucent actuator button of the control switch 225 so as to be visible therethrough. The LED 221 will be energized and glow whenever the lamp plugged into the receptacle 212 can be operated under the control of the system 20. On the other hand, the LED 221 will be off when the lamp is not under the control of the system 20 such as, for example, when the lamp has its own switch turned to the off position, thereby interrupting the load circuit.

The inverter section 223 and the resistor 224 provide a load sense feature for the slave unit 200. The microprocessor 220 samples its K2 input terminal early in the positive half of each cycle of the AC line voltage. This test is made after the positive-going zero crossing but before the AC line voltage has reached 30 degrees in its cycle. If the junction Z between the receptacle 212 and the triac 215 is at zero volts during this test interval, it will be because there is no current in the receptacle 212, such as when the lamp switch has been opened. The resistor 214 across the triac 215 prevents leakage currents from giving a false indication of a complete circuit. If the load circuit through the lamp is complete, the junction Z will be high and the output of the inverter 223 will be low within 750 microseconds after a zero crossing. This will present a logic zero level at the K2 input terminal of the microprocessor 220, signifying that the load circuit is complete. On the contrary, a logic one level at the K2 input terminal during the test interval indicates that the load circuit is open. This information is used by the microprocessor 220 to set the state of the LED 221. Thus, when the load switch is open the LED 221 is off and when the load switch is closed the LED 221 is on.

In addition, the logic of the microprocessor 220 is designed so that each time the load circuit is seen to open and close, the output power of the slave unit 200 will be toggled. Thus, for example, if the lamp is on and its switch is turned off and then on again, the lamp will flash briefly and then go out as the triac 215 is turned off and power through the receptacle 212 is interrupted. The brief flash of the lamp indicates that although it goes off, its switch is still closed and it can still be operated by the system 20. The LED 221 will be energized to further indicate this condition. If the lamp switch is again turned off and then on, the lamp will turn on to its full brightness and remain on, until these switch cycles are repeated.

Connected in series between the hot AC line and the K8 input terminal of the microprocessor 220 are an inverter section 228 of the hex inverter and a limiting resistor 229. The inverter section 228 squares up the AC line voltage and provides the 60 Hz clock reference signal for communications timing and for the phase control of the triac 215.

The lamp slave unit 200 includes a transmitter/modulator 230 for transmitting signals to the central control unit 30. The transmitter/modulator 230 has an inverter oscillator which includes three inverter sections 231, 232 and 233 of the hex inverter. Connected in parallel with the inverter section 232 is the series combination of a capacitor 234, a resistor 235 and a resistor 237, a diode 236 being connected in parallel with the resistor 235. A resistor 238 is connected between the input of the inverter section 233 and the junction between the capacitor 234 and the resistor 235. A resistor 239 is connected between the output of the inverter section 231 and the base of a transistor 240, the emitter of which is connected to the $V_{SS}$ supply. A Zener diode 241 is connected across the emitter-collector junction of the transistor 240. A diode 242 is connected between the input of the inverter section 233 and the R8 output terminal of the microprocessor 220, this terminal also being connected to neutral through a resistor 243.

The construction and operation of the transmitter/modulator 230 is essentially the same as that of the transmitter/modulator 110 in the central control unit 30, described above. The collector of the transistor 240 is connected to the tap of a center-tapped winding of a coupling transformer 245, this winding being tuned by a capacitor 246, the other winding of the transformer 245 being connected to the AC line through a coupling capacitor 247. The transformer 245 operates in the same manner as was described above with respect to the coupling transformer 125 in the central control unit 30.

The lamp slave unit 200 also includes a receiver/demodulator, generally designated by the numeral 250, for receiving and demodulating signals transmitted from the central control unit 30. The receiver/demodulator 250 includes a transistor 251 having its emitter connected to the $V_{DD}$ supply, having its base connected to the tuned winding of the transformer 245 through a resistor 252 and having its collector connected to the $V_{SS}$ supply through a resistor 253. A capacitor 254 is connected across the emitter-collector junction of the transistor 251, and the collector is connected through an inverter section 255 of the hex inverter and a resistor 256 to the K4 input terminal of the microprocessor 220. A diode 257 is connected in parallel with the resistor 256, and a capacitor 258 is connected between the K4 input terminal of the microprocessor 220 and the emitter of the transistor 251. A resistor 259 may be connected between the base of the transistor 251 and the $V_{SS}$ supply. The construction and operation of the receiver/demodulator 250 is identical to that of the receiver/demodulator 130 described above with respect to the central control unit 30.

A capacitor 260 is connected between the $V_{SS}$ supply and the OSC input terminals of the microprocessor 220. Connected in series between these terminals and neutral are a resistor 261 and a variable resistor 262. The capacitor 260 and the resistors 261 and 262 constitute the control circuit for the internal oscillator of the microprocessor 220, the resistor 262 being adjustable to provide the precise 500 KHz frequency required.

The initializing circuit for the microprocessor 220 is provided by a diode 263 connected between the $V_{DD}$ and INIT terminals of the microprocessor 220, and a capacitor 264 connected between the $V_{SS}$ and INIT terminals, this initializing circuit operating in the same manner as was described above in connection with the microprocessor 100 in the central control unit 30.

Referring now to FIG. 6 of the drawings, the appliance slave unit 300 is very similar to the lamp slave unit 200. The appliance slave unit 300 includes a three-prong plug 301 which is mounted on the back of the unit housing. The plug 301 is coupled to a power supply 302. More specifically, the hot line of the plug 301 is connected through a line-dropping capacitor 303 and a choke coil 304 to one leg of a full wave bridge rectifier comprising diodes 305, 306, 307 and 308 and a capacitor 309, the opposite leg of the bridge being connected to the neutral AC line. The $V_{SS}$ supply voltage is provided at one terminal of the capacitor 309, the other terminal thereof being connected to a circuit ground. Also connected in parallel between the $V_{SS}$ supply and the circuit ground are a capacitor 310 and a Zener diode 311. The capacitor 310 filters the output of the diode bridge and the Zener diode 311 limits the $V_{SS}$ supply voltage to 9.1 volts.

The hot AC line is connected to one terminal of a three-terminal receptacle 412 through the contacts 313 of a relay 314, the other terminals of the receptacle 312 being respectively connected to the neutral and ground lines of the plug 301. Connected in series between the hot AC line and the circuit ground are a triac 315 and the coil 316 of the relay 314. A resistor 317 is connected between the gate electrode of the triac 315 and the O2 and O3 output terminals of a microprocessor 320. A varistor 318 may be connected across the AC line for the same purpose as was explained above in connection with the lamp slave unit 200.

The appliance to be controlled is plugged into the receptacle 312 and power is delivered to this appliance through the relay 314, which is driven by the triac 315. The triac 315 is in turn driven by the microprocessor 320, but in this case the gate drive is either provided at 100% duty cycle or 0%, i.e., the gate is simply driven by DC output from the microprocessor 320. There is no pulsing or phase control involved here.

An LED 321 is connected in series with a resistor 322 between the R9 output terminal of the microprocessor 320 and the circuit ground. A push-button control switch 325 is connected between the R10 output terminal and the K1 input terminal of the microprocessor 320. A four-element house code selector switch 326 and a four-element unit code selector switch 327 have the elements thereof connected between the K1 input terminal and the R0 to R7 output terminals, respectively, of the microprocessor 320. The control switch 325 and the house code and unit code switches 326 and 327 are scanned by the microprocessor 320 in exactly the same manner as was described above in connection with the lamp slave unit 200. Also, the actuator button for the switch 325 is translucent and the LED 321 is disposed therebeneath so as to be visible therethrough, as in the case of the lamp slave unit 200.

However, in this case the microprocessor 320 has its K1 input terminal and O6 output terminal tied together and this effects a change in the microprocessor program which converts it from a lamp slave unit to an appliance slave unit. The program of the microprocessor 320 is such that the LED 321 is on when the output of the slave unit 300 is turned on, and is off when this output is turned off. The appliance slave unit 300 has no load sensing and, therefore, no capability to be turned on or off by a switch in the appliance circuit. Consequently, LED 321 is used simply to indicate the on or off status of the output receptacle 312.

An inverter section 328 and a resistor 329 are connected in series between the AC line and the K8 input terminal of the microprocessor 320, the inverter section 328 preferably being a section of an integrated-circuit hex inverter which has the supply terminals thereof respectively connected to the $V_{SS}$ supply and the circuit ground, as indicated at H+ and H−. The inverter section 328 squares up the AC line signal for presentation to the microprocessor 320 to provide the 60 Hz synchronizing clock signal, in the same manner as was described above in connection with the lamp slave unit 200.

The appliance slave unit 300 also includes a transmitter/modulator 330, a coupling transformer 345 and a receiver/demodulator 350 which are, respectively, substantially identical in construction and operation to the corresponding circuits 320, 245 and 250 of the lamp slave unit 200 and, accordingly, no further description of these circuits is necessary. A capacitor 360 and resistors 361 and 362 cooperate to provide the precise 500 KHz frequency for the internal oscillator of the microprocessor 320 in the same manner as was described above in connection with the lamp slave unit 200.

The initializing circuit for the microprocessor 320 includes a transistor 363 having the emitter thereof connected to the circuit ground and the collector thereof connected to the INIT input terminal of the microprocessor 320. The $V_{SS}$ supply is connected to the collector of the transistor 363 through a resistor 364 and to the base of the transistor 363 through a Zener diode 366 and a resistor 367. The junction between the Zener diode 366 and the resistor 367 is connected to the circuit ground through a resistor 368. If the $V_{SS}$ supply is at 9 volts, then the Zener diode 366 will turn on and provide base current to the transistor 363, pulling its collector to ground and allowing the microprocessor 320 to run. If the $V_{SS}$ supply drops to about 8 volts, the Zener diode 366 will shut off and remove the base current from the transistor 363, allowing its collector to rise to $V_{SS}$. This high level on the INIT terminal resets the microprocessor 320, which turns off the drive for the triac 315. In other words, the collector of the transistor 363 will be at the $V_{SS}$ level as long as $V_{SS}$ is below about 8.5 volts. When $V_{SS}$ goes above 8.5 volts, the collector of the transistor 363 goes to ground and allows the microprocessor 320 to run, starting with the appliance load turned off. This more complicated initializing circuit virtually guarantees that the microprocessor 320 cannot lock up with the load power turned on.

In both the lamp slave unit 200 and the appliance slave unit 300, the microprocessor output pin 13 is labelled TEST. If power is applied to the slave units while pin 13 and terminal K1 of the microprocessor are connected together, the microprocessor will start up in a test routine. This test routine consists primarily of repeated scans through the R and O output terminals. The principal purpose for this test mode is to allow adjustment of the microprocessor oscillator without having to disturb the frequency of that oscillator by direct application of a frequency-measuring instrument. The test pattern is also used on automated factory equipment to prove operational status of the microprocessor output lines during slave unit testing.

The circuitry of the wall switch slave unit 400 is substantially identical to that of the lamp slave unit 200, with the exception that in place of the plug 201 and the receptacle 212, wires or the like are provided on the back of the wall switch slave unit 400 for connection to the AC line and the built-in fixture to be controlled. Accordingly, no further description of the operation of the wall switch slave unit 400 is necessary.

The microprocessors 100, 220 and 320 are computer devices which are programmed using conventional techniques, and suitably interfaced with other devices in the central control unit 30 and the slave units 200, 300 and 400. It is contemplated that the operational programs of the microprocessors 100, 220 and 320 be permanently recorded in a read only memory (ROM) at the time of manufacture, and thus be an integral and unalterable part of the device. By way of example, and without in any way intending to limit the scope of the invention, a suitable microprocessor is one selected from the "TMS 1000" series of MOS/LSI one-chip microcomputers manufactured by Texas Instruments Incorporated. As described by Texas Instruments, the TMS 1000 series is a family of P channel MOS four-bit microcomputers with a ROM, a RAM, and an arithmetic logic unit on a single semiconductor chip. Thus, the device is a single-chip binary microcomputer. A customer's specification determines the software which is reproduced during semiconductor wafer processing by a mask technique which defines a fixed ROM pattern. Preferably the microprocessor 100 is the TMS 1670 and the microprocessors 220 and 320 are the TMS 1000.

The program flow charts for the software are described below with particular reference to FIGS. 13A through 17 of the drawings. Architecture of the TMS 1000 series microprocessors is disclosed in U.S. Pat. No. 3,991,305, and further details of the construction and operation of these microprocesses are disclosed in the following Texas Instruments publications: "TMS 1000 Series Data Manual", December, 1976; "TMS 1000 Microcomputer Circuit Design", June, 1977; "CMOS TMS 1000 C/1200C Data Manual", February, 1978; and "TMS 1000 Family Single-Chip Microcomputer", September, 1979.

Referring now to FIGS. 7 through 12 of the drawings, the coding and modulation schemes of the appliance control system 20 will be described. Communication between the central control unit 30 and the peripheral slave units 200, 300 and 400 is achieved by means of serial bit transmission. A message from the central control unit 30 consists of 17 serial bits, as illustrated in FIG. 7. A Start bit precedes each transmission to alert the slave units that a message is forthcoming. The Start bit is followed by a 4-bit house code of binary Ones and Zeroes, which is unique to the system 20 and distinguishes it from other such systems which might be utilized in the same building. As indicated above, this house code is determined by the setting of the house code switch 32 on the central control unit 30. All of the slave units in the system 20 have their house code switches 226 or 326 set to this same house code. The 4-bit house code is followed in the message by a 7-bit unit code which is the address of the specific slave unit for which the message is intended, the unit code of each slave unit being determined by the setting of its unit code switch 227 or 327. The unit code is followed in the message by a 5-bit function code which indicates the function to be performed by the addressed slave unit. Such functions include turning ON or turning OFF the slave unit output power, checking and transmitting the status of the slave unit and, in the case of the lamp slave unit 200 or the wall switch slave unit 400, dimming or brightening the controlled lamp or turning it on to a predetermined intermediate brightness level.

Each command message is transmitted twice from the central control unit 30 for added security in the transmission link. Where the commanded function is a status request, the interrogated slave unit responds by sending back a 6-bit message including a Start bit and a 5-bit status code, as illustrated in FIG. 8.

The message transmission scheme utilized in the appliance control system 20 is pulse-width modulation, in which various length carrier bursts represent different logic levels and synchronization pulses. Each bit of a message is synced to the positive-going zero-crossings of the 60 Hz AC line voltage 500 (see FIG. 7) and, therefore, the bit period is 16.67 ms. Referring to FIG. 9, the bit coding is such that a logic Zero bit equals 4 ms of carrier and 12.67 ms of no carrier, a logic One bit equals 8 ms of carrier and 8.67 ms of no carrier, and a Start bit equals 12 ms of carrier and 4.67 ms of no carrier.

In order to achieve synchronization to the AC line zero-crossings, in each of the central control unit 30 and the slave units 200, 300 and 400, the K8 input terminal of the microprocessors 100, 220 or 320 is monitored by the microprocessor software to determine the state of the AC line, as was explained above. In the case of the central control unit 30, the K8 input is connected through two inverter sections 86 and 87, while in the slave units this input is connected to only a single inverter section 228 or 328, so that the signal at K8 is actually inverted from the AC line. The microprocessor software in the slave units is written to take account of this polarity inversion, so it is of no consequence in the overall system operation.

The microprocessor programs of both the central control unit 30 and the slave units 200, 300 and 400 operate in a similar manner to achieve line synchronization. Basically, sometime shortly before a positive-going zero-crossing of the AC line voltage is expected, the software drops into an idle state in which it constantly monitors the K8 input terminal. When the appropriate zero-crossing occurs on the K8 terminal, the program immediately begins executing the appropriate subroutine. If the slave unit has been previously instructed to transmit, then the zero-crossing on the K8 terminal will cause the first bit to be transmitted within a few microseconds. After a bit transmission has begun, the software shifts to a timing loop in order to determine the width of the bit in process. The timing loop is a sequence of instructions to be executed by the microprocessor, and includes a counter.

In the case of pulse-width modulation, the counter may be set to one of three different values, corresponding to the lengths of the three bits used, viz., Start, One and Zero. The first time the software enters the timing loop sequence, it loads the appropriate number into the counter. Each subsequent time the program goes through the sequence, it decreases the value of the counter by one unit. The program continues to go around this same set of instructions repeatedly, each time decrementing the counter by one unit until the counter reaches zero. At this point the transmission of that bit is completed and the program is directed to go to a different state and execute a different sequence of instructions. Since the execution time of each individual program instruction is precisely known, the sequence of instructions in the timing loop is also precisely known. Therefore, the overall time which will be spent in the timing loop is a precise function of the number to which the counter was originally set.

During the transmission of the Start bit of a message any of the closed segments of house code switch 32 on the central control unit 30 (FIG. 4B) will transfer the high level on the microprocessor output terminal R15 through the appropriate diode 94 to one of the microprocessor input terminals L1, L2, L4 or L8. Before the end of the Start bit, the information present on the L1-L8 terminals is read by the microprocessor 100 and stored. These house code bits are then transmitted, following the Start bit, as the leading part of the total message. The unit code and function code portions of the message will have been previously stored in the RAM of the microprocessor 100 by operation of the keyboard 40, and the microprocessor software will operate to transmit the unit code and function code immediately following the house code. This transmission can be initiated either by manual operation of a function key on the keyboard 40 in a manual mode of operation of the system 20, or by the coincidence of the current time-of-day with a programmed time, when the system 20 is operating in an automatic mode, as will be explained more fully below.

Referring now to FIG. 11 of the drawings, in most private homes which are wired for 220-volt service, power in any given outlet will be either at zero phase, corresponding to the solid line waveform 501, or 180 degrees out of phase, corresponding to the dot-dashed waveform 502. Most industrial facilities are wired with three-phase power, and outlets around such a facility will be found at either zero phase, 120-degree phase, corresponding to the short-dashed waveform 503, or 240-degree phase, corresponding to the long-dashed waveform 504. If a slave unit is considered to be on phase zero, then it is possible that the central control unit 30 which is communicating with this slave unit could be on a phase which is 120, 180 or 240 degrees displaced from the slave unit's own phase.

Since all message bits are locked to the AC line, a slave unit knows that there are only four times relative to its line-derived 60 Hz clock that an incoming message may begin. These four times, accounting for three-phase power distribution, are zero degrees, 120 degrees, 180 degrees and 240 degrees. Consequently, each slave unit monitors its receiver input at the K4 input terminal of the microprocessor 220 or 320 at the prescribed times based upon its own 60 Hz reference clock. If a logic high voltage level is detected at any of the sampling times, indicating carrier or noise, the slave unit commences a testing scheme designed to test the validity of the signal and decode the message bit.

Referring to FIG. 10, once the slave unit has determined the presence of a logic high level at one of the four possible phase times, it tests the receiver input again at 2 ms, 6 ms, 10 ms and 14 ms thereafter, respectively designated as times $t_1$ through $t_4$. Based upon these four test samples, the slave unit accepts only three possible combinations as valid bits. By way of illustration, a Start bit is shown in FIG. 10, but by comparing the sampling times $t_1$ through $t_4$ with FIG. 9 which is on the same time base, it can be seen that samples of 1,0,0,0 at the four sampling times correspond to a logic Zero bit, 1,1,0,0 is a logic One bit and 1,1,1,0 is a Start bit. All other combinations are invalid and will cause the slave unit to reset its testing sequence and start the process over again the next time carrier is detected.

To further insure error-free operation of the system 20, the microprocessor 100 of the central control unit 30 is programmed to transmit each message twice, and each slave unit has its microprocessor programmed to respond to execute the command function only after reception of two complete, valid, identical messages which match its house and unit codes. When a slave unit perceives the beginning of an incoming message, its microprocessor goes into a program routine which evaluates the message bits one by one as they arrive. After all 17 bits of the first message transmission have been accepted, they are stored internally in the microprocessor, which continues to monitor the AC line, now watching for the second message transmission. As the second message comes in, it is also checked on a bit-by-bit basis just as the first was. When both messages have been completely received and stored, the microprocessor goes into another routine which compares the two stored messages. If the two messages agree with each other identically, contain the correct house code and unit code for that slave unit, and constitute a valid instruction, then and only then does the slave unit execute the commanded function. If the two messages differ from one another, no operation is performed by the slave unit, and it will go back into its monitoring routine and wait for more messages.

If the message transmitted from the central control unit 30 is a request for status, immediately after the transmission of the status request message the microprocessor 100 begins monitoring its K2 receiver input terminal for a period of 99 ms for a logic high voltage. Referring to FIG. 12, after carrier is detected, the microprocessor 100 goes into a test routine, first sampling the receiver input again 0.5 ms later to insure that the detected logic high was not a short noise spike. At this point, or any consecutive sampling point when the incoming bit fails to meet the test criteria, the microprocessor 100 ends its attempt at status reception and resumes normal activities. During the test sequence, samples of the K2 receiver input terminal are again taken at 1.5 ms, 2.5 ms, 5.5 ms, 6.5 ms, 9.5 ms, 10.5 ms and 13.5 ms relative to the first perceived edge of the incoming bit. The test criteria are as follows:

(1) The 1.5 ms and 2.5 ms samples must both be high in all cases for the test to continue;

(2) A low at 5.5 ms indicates that the bit is a logic Zero;

(3) A high at 5.5 ms and a low at 6.5 ms is interpreted as a logic Zero. This allows for a brief noise spike to be present during the transmission of a logic Zero.

(4) If 5.5 ms and 6.5 ms tests are high, a low at 9.5 m.s. indicates that the bit is a logic One;

(5) A high at 9.5 ms and a low at 10.5 ms is interpreted as a logic One. This allows for a brief noise spike to be present during the transmission of a logic One;

(6) If 9.5 ms and 10.5 ms tests are high, the test at 13.5 ms must be low, indicating a Start bit, or the central control unit 30 will resume normal activities.

Each time a bit is received, the 99 ms period begins anew, so that in effect the six bits of a status response message could be separated from one another by as much as 99 ms and still be accepted as a valid message. When a slave unit receives a status request message, it checks the state of its associated load device and replies with either an ON or an OFF six-bit status message, as illustrated in FIG. 8. At the central control unit 30, six complete message bits will be decoded. If the message is a valid status code, the central control unit 30 will display "ON" or "OFF" on the large characters 34 of the display panel 35, depending upon the contents of the status message.

The central control unit 30 operates in any one of five modes, to-wit, MANUAL, AUTO, REVIEW, PROGRAM and SET CLOCK. The SET CLOCK mode is used only to set the internal clock of the microprocessor 100 whereby the current time-of-day and day-of-the-weak are displayed on the display panel 35. This setting operation must be performed when the central control unit 30 is first plugged in, or to correct the timekeeping after a power failure. The clock is set by operation of the appropriate keys 41 on the keyboard 40 to enter the current time-of-day and day-of-the-week into the microprocessor 100, whereupon it will continue to maintain and display the correct current time. The battery 72 serves to allow the central control unit 30 to retain any information stored in the microprocessor 100 when the AC power fails, including the time at which the power was interrupted. When AC power is restored, the clock resumes timekeeping from where it was when it was interrupted and the display panel 35 blinks on and off to show that the clock may need to be reset.

The PROGRAM mode is utilized for storing command messages in the microprocessor RAM for later transmission to the slave units. The command messages are entered by means of the keyboard 40 in the form of "events", each "event" including the number of the slave unit to be addressed, the nature of the function to be performed by that slave unit, the time of day at which it is to perform the function, and the day of the week on which the function is to be performed. By use of the DAILY key a function can be programmed to occur every day by entry of a single event. The events programmed into the microprocessor RAM are later automatically transmitted to the slave units for execution at the programmed times when the central control unit 30 operates in its AUTO mode. The CLEAR key is utilized in the program mode for clearing entries from the RAM to effect changes in the program, correct errors and the like.

Figure 13A:
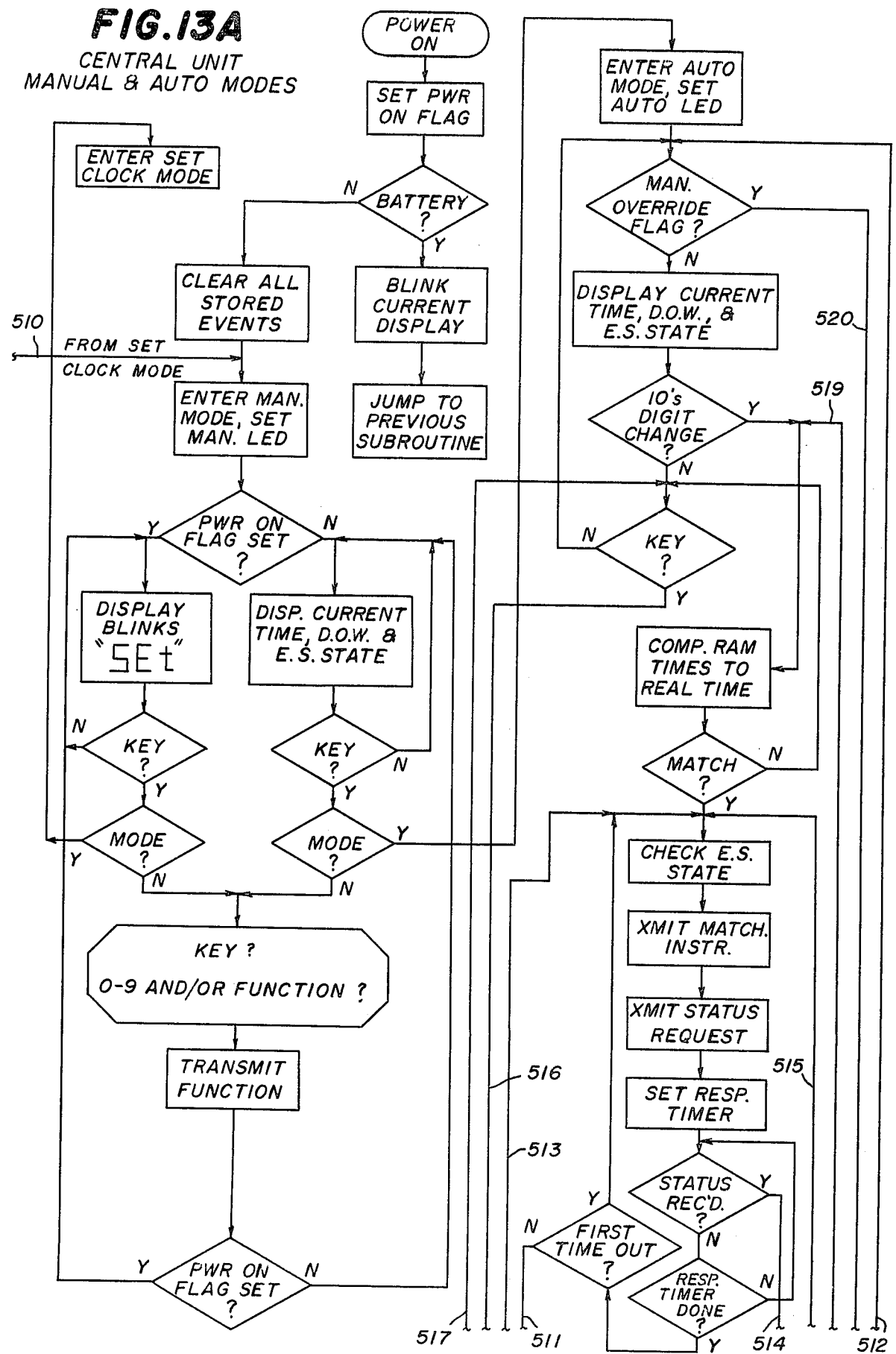
FIGS. 13A and 13B are a program flow chart depicting the operational steps prformed within the microprocessor of the central control unit in its MANUAL and AUTO modes of operation.

Referring now to FIG. 13A, operation of the central control unit 30 in its MANUAL mode will now be described. When the central control unit 30 is initially plugged in, its power is turned on and the microprocessor program sets a "Power On" flag and then asks whether or not the battery 72 is connected. If it is, the current display on the display panel 35 will be caused to blink on and off and the program will then jump to the previous subroutine which was in operation when the AC power was last interrupted. If the battery 72 is not connected, the program clears all events stored in the microprocessor RAM and enters the MANUAL mode, energizing the corresponding LED 42, and then asks if the "Power On" flag is set. In this case it is, so the program causes the display panel 35 to blink on and off with the dislay "SEt", to indicate to the user that the clock must be set. The program then asks if a key on the keyboard 40 has been actuated. If it has not, the program continually repeats the "SEt" display and the key inquiry until a key has been actuated. At that point the program asks if the MODE SELECT key is the one which has been actuated. If it is, the program automatically jumps to the SET CLOCK mode.

In addition to entering the MANUAL mode as a result of power turn-on, the program can also enter the MANUAL mode from the SET CLOCK mode, as indicated at line 510, by actuation of the MODE SELECT key. In this case, the "Power On" flag will not have been set and, therefore, the program exits that decision on the "No" line to the right and causes the current time-of-day and day-of-the-week to be displayed. The program then again asks if a key has been depressed and if that key is the MODE SELECT key in the same manner as described above in the case when the "Power On" flag had been set. In this case, however, when the MODE SELECT key is actuated, the program enters the AUTO mode.

In summary, when the central control unit 30 is first plugged in, the program will come up in the MANUAL mode and the system 20 can be operated manually in this mode. The first actuation of MODE SELECT key thereafter will cause the program to enter the SET CLOCK mode, and further actuations of the MODE SELECT key will cause the program to repeatedly cycle back and forth between the MANUAL and SET CLOCK modes until the clock is set. No other mode can be entered until the clock is set. But once the clock is set, repeated actuations of the MODE SELECT key will cause the program to sequence through the MANUAL, AUTO, REVIEW, PROGRAM and SET CLOCK modes, in that order.

If the key actuated is not the MODE SELECT key, the program will ask what key it is and transmit the corresponding function message. The program then asks if the "Power On" flag is set. If not, it returns to display the current time-of-day and day-of-the-week, and if it is, it returns to blink the "SEt" display. Thus, it can be seen that in the MANUAL mode, each command function is transmitted and executed as it is keyed into the central control unit 30 by the user.

A significant feature of the present invention is the PRESET DIM function. When the central control unit 30 is in its MANUAL mode, the DIM and BRIGHT keys can be used to effect a dimming or brightening of the lamp connected to a lamp slave unit 200 or a wall switch slave unit 400. Thus, if the lamp switch is closed, operation of the DIM key at the central control unit 30 can be used to transmit to the associated slave unit a signal which will cause the microprocessor to vary the gating pulses for the triac 215 through the various brightness levels for maximum brightness to full off. In like manner, the BRIGHT key can be used to increase the brightness level of the controlled lamp. Once the lamp has been adjusted to a desired brightness level, operation of the PRESET DIM key at the central control unit 30 will cause a command message to be sent to the slave unit instructing it to store in its microprocessor RAM that preset brightness level, in a manner which will be explained more fully below. Thereafter, whenever that slave unit is addressed while is is in its fully on or fully off condition, actuation of the PRESET DIM key of the central control unit 30, while it is in either the MANUAL or AUTO mode, will cause the addressed slave unit to turn on to its PRESET DIM level of brightness. If the addressed slave unit is at some intensity level which is neither fully on nor fully off, then when the PRESET DIM key of the central control unit 30 is actuated, the slave unit microprocessor is instructed to memorize the current brightness level and store it as the new PRESET DIM level. If no PRESET DIM level has been set by the user, actuation of the PRESET DIM key when the addressed slave unit is fully on or fully off will cause it to turn on to an intermediate brightness level set by the manufacturer, such as 50% of full brightness.

Figure 13B:
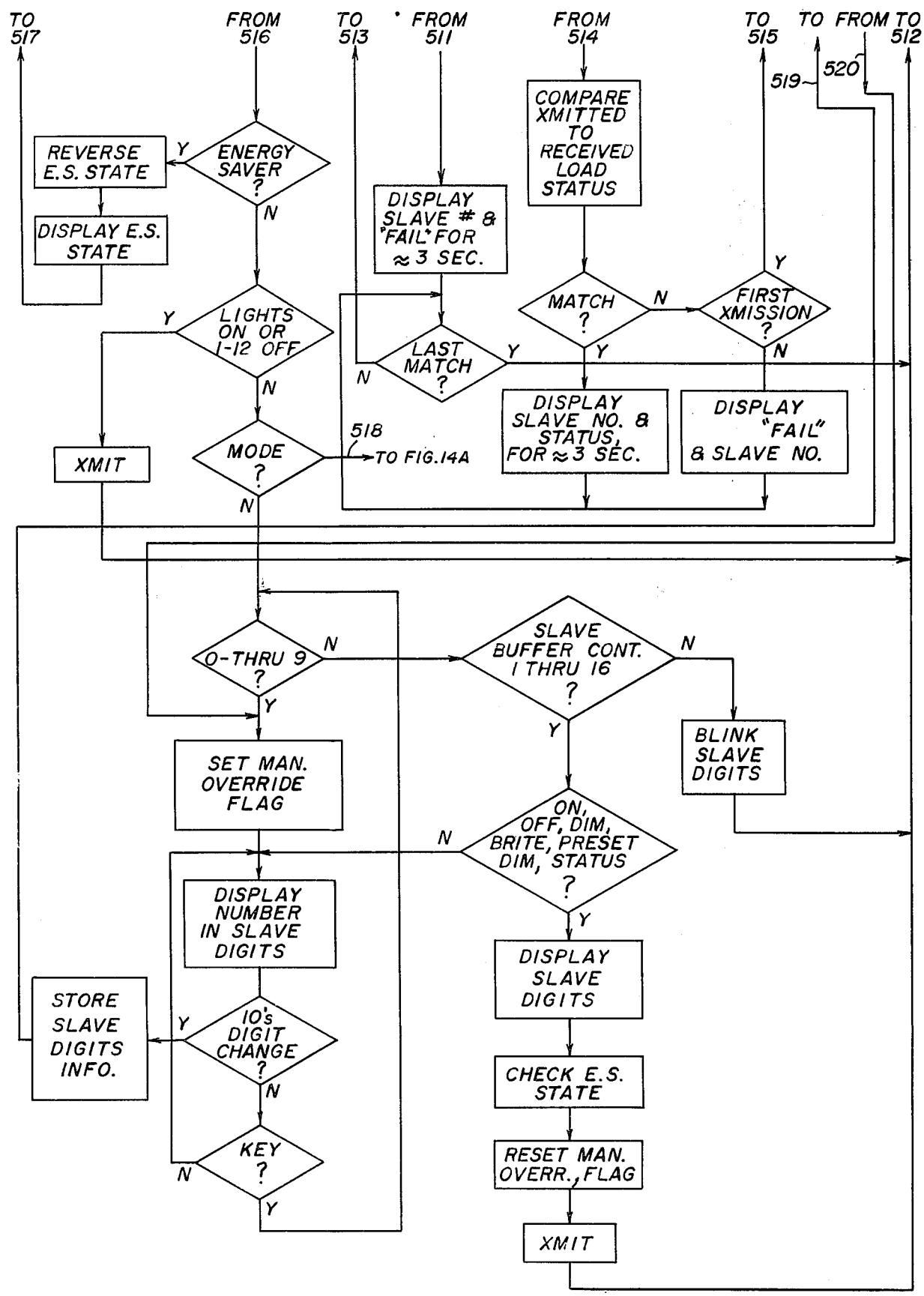

Referring now also to FIG. 13B, operation in the AUTO mode will be explained. As indicated above, it is presumed that, when the central control unit 30 is operating in the AUTO mode, the microprocessor RAM has been preprogrammed with a series of events to be executed. When the AUTO mode is entered, (see FIG. 13A) the corresponding LED 43 is energized and the program drops to a decision which asks if the "Manual Override" flag is set. If it is not, the program displays the current time-of-day, day-of-the-week and energy-saver state, i.e., whether or not the central control unit 30 is in an energy-saving condition. If the central control unit 30 is in an energy-saving condition, "ES" will be displayed by the small characters 38 on the display panel 35. Each time the ENERGY-SAVER key is actuated, the energy-saving condition will be reversed. The significance of this energy-saving feature will be discussed more fully below.

The program next asks whether or not the 10's digit of the current time display has changed. The significance of this is that the microprocessor 100 is programmed so that in the AUTO mode, it can transmit a programmed instruction only at multiples of ten minutes, e.g., at 5:10 P.M., 5:20 P.M., etc. Accordingly, the user will have programmed these events to occur at such ten minute intervals.

If the 10's digit has changed, the program compares the current real time with the times of the events stored in the RAM and asks if there is a match. If there is, the program checks the energy-saver state and then transmits the instruction message for the matched event. If the microprocessor 100 is in its energy-saver condition, and the matched instruction is an ON instruction, the program will internally modify the transmitted message to command that the slave unit be turned on to an energy-saving condition, i.e., a reduced-power condition. Such an energy-saving command can be responded to only by a lamp slave unit 200 or a wall switch slave unit 400, since only these slave units have the triac dimming circuits which can be actuated to intermediate brightness levels. When an appliance slave unit 300 is turned on, it is always turned on to its full power condition.

The enery-saver state of the slave unit 200 or 400 can be programmed into it from the central control unit 30 by use of the DIM or BRIGHT keys 41, as explained above in connection with the PRESET DIM operation. Then, whenever an ON instruction is sent to that slave unit while the central control unit 30 is in the AUTO mode and in the energy-saver condition, that slave unit will be automatically turned on to its PRESET DIM level, thereby effecting an energy savings. If no PRESET DIM level has been programmed by the user, then the slave unit will be turned on to the intermediate brightness level set by the manufacturer.

Returning now to the program flow chart for the AUTO mode of operation, the command message for the matched event will be transmitted twice, as was indicated above, and immediately thereafter, a status request message will be twice transmitted. The program will then set a response timer, establishing the 99 ms time period within which the response to the status request must be received. The program then asks if the status message has been received. If it has not, the program asks if the response time period has expired and if it has not, it continues looking for the status message. If the 99 ms time period has expired and the status message has still not been received, the program proceeds to a decision which asks whether this is the first time that this command instruction and status request have been transmitted. If it is, then the program repeats the sequence of transmitting the matched event message and the following status request message. If the status message is again not received within the response time period, the program again proceeds to the "First Time Out" decision, but this time exits to the left on the "No" branch at line 511 because this is the second transmission.

The program then causes the addressed slave unit number and the word "FAIL" to be displayed on the display panel 35 for about three seconds. The program then asks if this matched event which was just unsuccessfully transmitted was the last event programmed for that particular ten-minute time interval. If it was, the program returns via line 512 to the "Manual Override Flag" decision and returns to its normal state of monitoring the current time clock for the occurrence of the next ten-minute interval. If the transmitted message was not the last event programmed to occur at the current ten-minute interval, then the program returns via line 513 to the "Check ES State" point and proceeds through the sequence of transmitting the next event programmed for that time period.

If the status response message is received within the 99 ms time period, the program exists the "Status Received" decision on the line 514 and compares the received load status with that which was transmitted and asks if they match. If they do, the program displays the slave unit number and the received status for about three seconds and then returns to the "Last Match" decision. If the received status does not match the transmitted function, then the program proceeds to ask if this was the first transmission of that command and status request message. If it was, then the program returns via line 515 to the "Check ES State" point in the program and repeats the cycle transmitting the command and status request messages. If this was not the first transmission, then the program causes the addressed slave unit number and the word "FAIL" to be displayed for about three seconds, and then advances to the "Last Match" decision.

Thus, it will be appreciated that the automatic status request transmission permits verification at the central control unit 30 of whether or not the transmitted command message was properly received and executed. By providing for a repeat transmission in the event of failure to receive the proper status response, the system also affords a redundancy which can compensate for momentary spurious signals, noise or other interference on the AC line which might prevent proper reception of signals by the slave units or the central control unit 30.

The central control unit 30 can be manually operated while it is in the AUTO mode. Thus, if the answer to the "Did 10's Digit Change" decision is no, the program asks if a key 41 has been actuated. If it has not, the program returns to the "Manual Override Flag" decision. If a key has been actuated, the program drops via line 516 to a decision which asks if the key which was actuated is the ENERGY SAVER key. If it was, then the program reverses the energy saver state, i.e., if the system was not previously in the energy saver condition, it is placed in that condition and vice versa. The program then displays the new energy saver state, i.e., it displays "ES" if the central control unit 30 is in the energy saver condition and displays nothing if it is not. The program then returns via line 517 to the "KEY" decision to ask if another key has been actuated.

If the first key actuated was not the ENERGY SAVER key, the program then asks if it was either the LIGHTS ON or the 1–12 OFF key. If it is either one of these keys, the appropriate command message is transmitted, i.e., in the event of the LIGHTS ON key, all of the lamp slave units 200 and wall switch slave units 400 whose unit codes are 12 or less will be turned ON, and in the event of the 1–12 OFF key, the slave units numbered 1 through 12 will be turned OFF. It is significant to note that when the LIGHTS ON key is actuated, the slave units indicated above will all be turned on to their maximum power level, regardless of the energy-saver state of the central control unit 30. This is because this key is intended to be used, for example, to flood the house with light when, e.g., the user suspects that an intruder might be present. In such cases, maximum brightness is normally desired.

If the actuated key was not the LIGHTS ON or 1–12 OFF key, the program next asks if it was the MODE SELECT key. If it is, the program enters the REVIEW mode (FIG. 14A) on line 518, and if it is not, the program then asks if it is any of the 0 through 9 keys. If it is, the program sets the "Manual Override Flag" indicating that a key has been manually actuated. It next displays the entered digit in the small characters 38 of the display panel 35, indicating the number of a slave unit to be addressed.

Next, the program asks if the 10's digit in the clock has changed. If it has, the program stores the slave digits information which was just entered and returns via line 519 to the point in the program which compares the current time-of-day to the times stored in the RAM to automatically transmit any messages which might be programmed to be sent at that time, after which it will return via line 512 to the "Manual Override Flag" decision. Since the "Manual Override Flag" is now set, the program will drop via line 520 to resume the interrupted manual operation.

The program again asks if the 10's digit is changed and the answer is now no, so the program asks if another key has been actuated and it will continue asking until the answer is "yes", at which time it will return to the "0 Thru 9" decision. If the actuated key is not 0 thru 9, the program will ask if the slave buffer contains a slave unit number 1 through 16. If not, the small characters 38 on the display panel 35 will blink on and off to indicate that a slave address needs to be entered, and the program will return via the line 512 to the starting point of the MANUAL mode. In this case, the slave buffer does contain a slave unit number since it has just been manually entered. Accordingly, the program asks if the last-actuated key is one of the ON, OFF, DIM, BRIGHT, PRESET DIM or STATUS keys, which represent valid function messages which can be transmitted to the slave unit. If one of these keys was not actuated, the program moves to the left and will continue waiting for another key to be actuated. If a valid function key was actuated, the program will display the addressed slave unit number, check the energy saver state, reset the "Manual Override" flag and transmit the selected function message, returning then via the line 512 to the beginning of the AUTO mode subroutine.

Figure 14B:
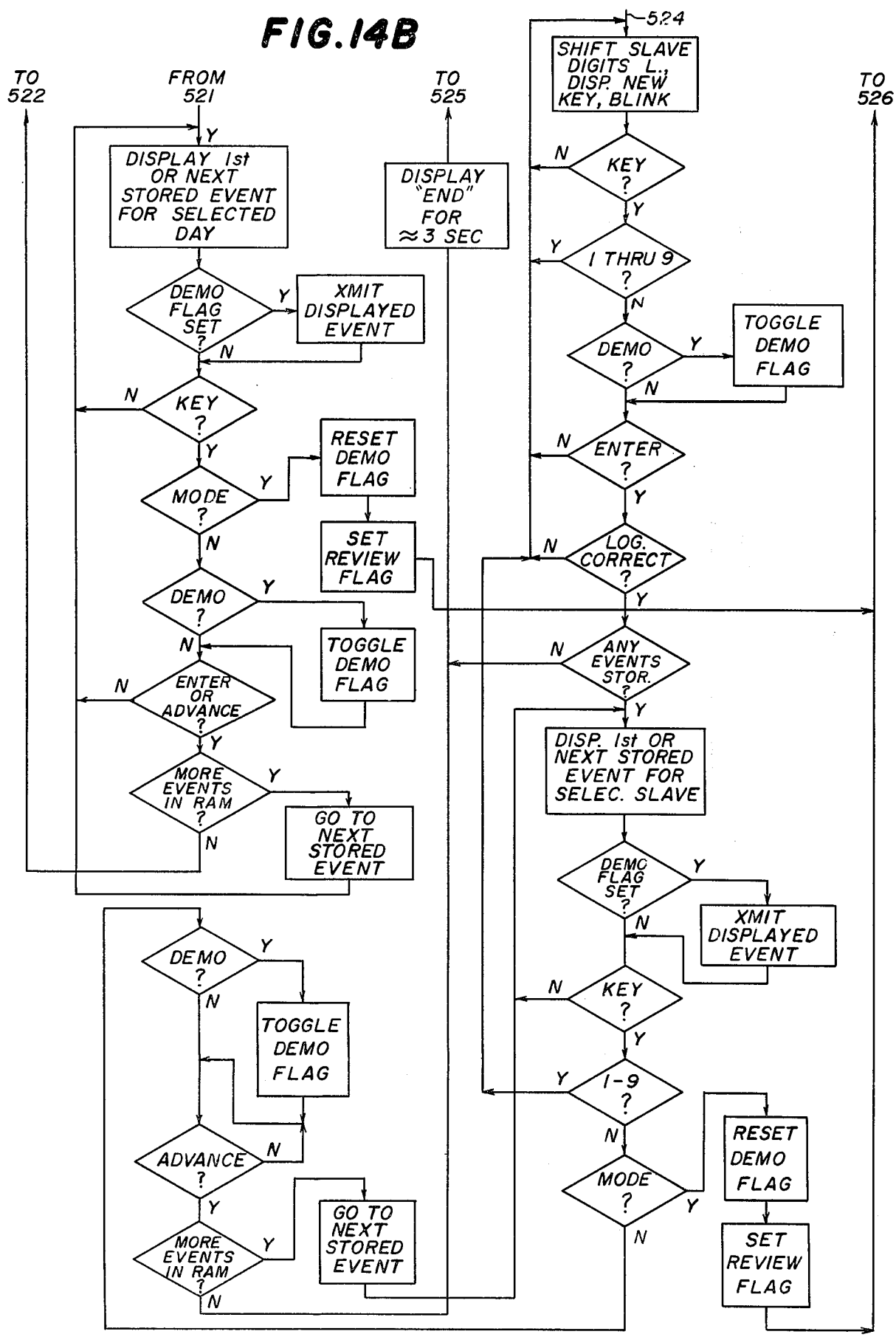

Referring to FIGS. 14A and 14B, the REVIEW mode of operation will be explained. The purpose of this mode is to permit the user to accelerate and display the events he has programmed in the RAM of the microprocessor 100 so that they can be reviewed quickly at the central control unit 30. The REVIEW mode is entered on line 518 from the AUTO mode, by actuation of the MODE SELECT key. The program first sets the "Review" flag, resets the "Demo" flag and turns on the LED 44. The program then causes the day-of-the-week display 37 to blink on and off, requesting the user to select a day. The program then awaits a key entry, and when it occurs, it asks if the actuated key is the MODE SELECT key or the DEMO key. If the former, the program resets the "Demo" and "Review" flags and enters the PROGRAM mode. If the latter, the program toggles the "Demo" flag. When the program is in the REVIEW mode, each time the DEMO key is actuated, the program reverses the DEMO state of the central control unit 30. When the "Demo" flag is set, the program is in a DEMO state and the LED 44 will blink on and off. When the "Demo" flag is reset, the program is not in the DEMO state and the LED 44 is on steadily. When the program is in the DEMO state of the REVIEW mode the central control unit 30 will automatically transmit each event as it is reviewed, so that the user can verify that the system 20 and all lights and appliances connected thereto are operating properly.

The program next asks at decision 523 if the actuated key was a day-of-the-week key, and if it is, the program moves left and causes the selected day display to blink on and off and looks for another key entry. If the next key is a day-of-the-week key, the newly selected day replaces the one previously displayed and another key entry is looked for. If the key is the DEMO key, the "Demo" flag is toggled. If the key is the ENTER key, or the ADVANCE key, the program asks if there is any event stored in the RAM of the microprocessor 100 for the selected day. If not, the program causes "End" to be displayed for about three seconds and then automatically advances to display the next day in sequence.

If events are stored in the RAM for the selected day, the program drops via line 521 to display the first or next stored event for that day. The program then asks if the "Demo" flag is set. If it is, the program automatically transmits the displayed event, so that execution thereof can be physically verified by the user. The program then looks for another key entry, and when it occurs, it asks if it is the MODE SELECT or DEMO key. If the answer to either of these questions is yes, the result is essentially the same as was explained above. The program then asks if the actuated key was the ENTER key or the ADVANCE key and, if so, asks if there are any more events stored in the RAM for the selected day. If not, the program returns via line 522 to display "End" and advance to the next day. If more events are stored in the RAM, the program will advance to the next stored event to display it and await another key entry.

Thus, it can be seen that when the REVIEW mode is initially entered, it will proceed to review the events stored in the RAM by the day of the week on which they are to occur. It is also possible to review the stored events by slave unit number, i.e., by sequencing through the slave units in numerical order and displaying for each slave unit all events programmed for that slave unit. Thus, returning to the "Day" decision 523, if the actuated key was not a day-of-the-week key, the program would drop to ask if it is the ADVANCE key. If so, the program will cause the display to blink "88" in the small characters 38 of the display panel 35, and will then blink any slave unit digits which have been entered (and none have so far) and then waits for a key entry. When one occurs, the program asks if it was the MODE SELECT or the DEMO key and, if so, takes the appropriate action as explained above. If it was a 1 through 9 key, the program drops via line 524 to shift the slave digits one digit to the left, blink the entered digit on the small characters 38 of the display panel 35, and then await another key entry. When it occurs, the program first asks if it is a 1 through 9 key and, if so, shifts the slave digits left in the display characters 38 and blinks the newly-entered digits. If the key was the DEMO key, the "Demo" flag is toggled, and if it was the ENTER key, the program first checks to see if this instruction is logically correct and then checks to see if there are any events stored in the RAM for the selected slave unit. If not, the program displays "End" for about three seconds and then proceeds via line 525 to advance to the next slave unit digit and blinks that digit on the display, and then awaits another key entry. If upon actuation of the ENTER key there were events stored in the RAM for the selected slave unit, the program displays the first or next stored event for that slave unit and then checks to see if the "Demo" flag is set. If so, the displayed event is transmitted.

The program then looks for another key entry and when it occurs, first asks if it is a 1 through 9 key. If so, the program returns to line 254 and blinks the newly-entered slave digit on the display. If not, the program then asks if it is the MODE SELECT or DEMO key and, if so, takes the appropriate action described above. The program then checks to see if it is the ADVANCE key. If so, the program checks to see if there are anymore events programmed in the RAM for the selected slave unit. If so, the program proceeds to that next event and displays it and if not, the program displays "End" for about three seconds and then returns via line 525 to advance to the next slave unit.

Thus, it can be seen that after entering the REVIEW mode, if the first key actuated is a day-of-the-week key, the program will proceed to review the stored events by day. But if the ADVANCE key is actuated before a day-of-the-week key, then the program will proceed to review the stored events by slave unit number.

The operation of the slave unit programs will now be described. Referring first to FIG. 15, there is illustrated a program routine for the lamp slave unit 200. When the lamp slave unit 200 is initially plugged in, the program turns off the triac 215 by removing gate signal from the O0 and O1 output terminals of the microprocessor 220, and then enters a monitoring mode in which it repeatedly samples the K2 input terminal of the microprocessor 220 to determine the condition of the load switch. The term "load switch" here refers to the switch which is disposed on the lamp being controlled by the slave unit 200. If the load switch is open, the LED 221 is turned off and if it is closed, the LED 221 is turned on.

The remainder of the program illustrated in FIG. 15 relates to the load switch toggle function of the lamp slave unit 200, which is a significant feature of the present invention. The program drops via line 530 to a decision asking if the signal port, i.e., the K4 input terminal of the microprocessor 220 is true, indicating that a message is being received. If not, the program proceeds to a decision 531 which asks whether the load sense has changed since the last time it was tested. If it has, the program drops to ask whether the load switch is now open. If it is, the load cannot be controlled by the system 20. Therefore, the program checks whether the triac 215 is on or off and leaves it in whichever condition it finds it and then turns off the LED 221, giving a visual indication that the load switch is open. If the load switch is not open, the program again checks the on/off condition of the triac 215 and reverses that condition, then turning on the LED 221 to indicate that the load switch is closed and that the load is, therefore, under control of the system 20.

Thus, it can be seen that whenever the program detects that the load switch has changed from an open condition to a closed condition, it will reverse the state of the triac 215. This permits the user to operate the lamp by the use of its own switch without removing it from control of the system 20. Thus, if he wants to turn the lamp off at its switch, he simply turns the switch off and then on again, and the lamp will give a momentary flash and then go off, even though its switch is closed. This momentary flash is provided to indicate to the user that although the lamp is now off, its switch is closed and therefore the lamp can be operated from the central control unit 30. When the user wants to turn the lamp back on, he simply again actuates its switch off and then on again.

In addition to control by its own switch, the lamp can also be controlled by the use of the control switch 225 on the lamp slave unit 200. Thus, the program of the microprocessor 220 is such that each time the control switch 225 is momentarily closed, the on/off state of the triac 215 is reversed for turning the power to the receptacle 212 on or off.

It is another significant feature of the present invention that by holding the control switch 225 closed, the user can effect a dimming or brightening of the associated lamp. This capability of controlling the dimming function both locally at the slave unit 200 as well as from the central control unit 30 is a significant advantage. The operation of this local manual dimming function will now be described with reference to the program flow chart of FIG. 16.

Figure 16:
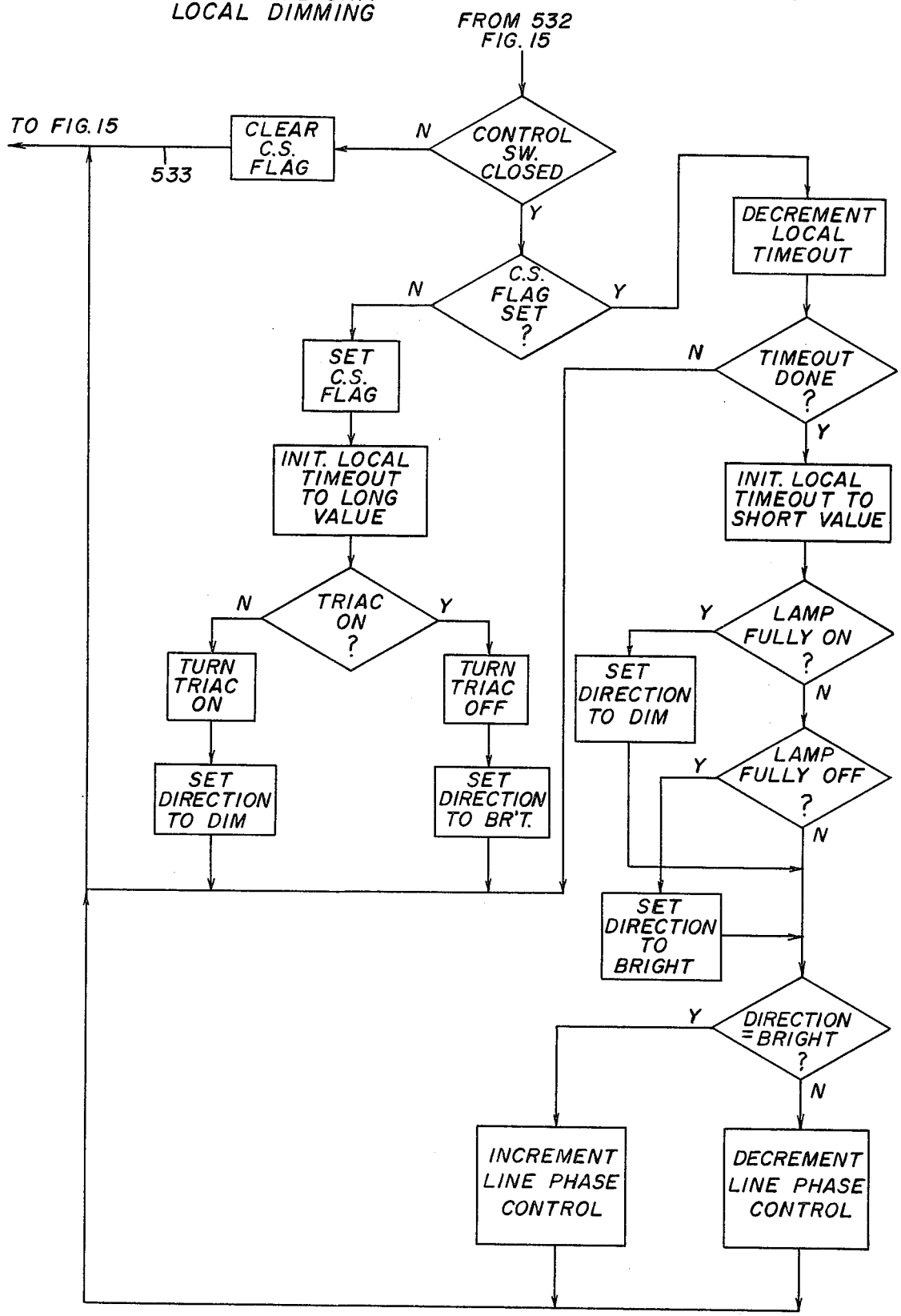

If at decision 531 in FIG. 15, the microprocessor 220 detects that the load sense has not changed since the last time it was tested, the program moves to the right on line 532 to FIG. 16 to ask if the control switch is closed. The term "control switch" refers to the control switch 225 on the lamp slave unit 200. If the control switch is not closed, the program moves to the left, clears the "Control Switch" flag and returns to line 530 in FIG. 15. The "Control Switch" flag refers to a bit inside the microprocessor 220 which is used to remember that the control switch was closed the last time it was tested. As long as the control switch is not closed, the program simply runs through this loop from line 530 to line 532 to line 533 and back to line 530 again.

If the control switch is found to be closed, then the program moves down to determine whether the "Control Switch" flag is set. If the flag is not set, it means that this is the first time the control switch has been found to be closed, so the program moves to the left and sets the "Control Switch" flag. It then initializes the local time-out, which is an internal counter, to a long value. This timer is used to determine two different things. In the first case (the program branch we are now in), this timer is given a relatively long value which determines how long the control switch must be held closed before brightening or dimming action commences. This time is typically two or three seconds and it effectively prevents the dimming operation from being initiated when the operator is using the control switch 225 to simply turn the lamp on or off.

Once the local time-out is initialized, the program determines whether or not the triac 215 is on. If it is not, the program moves to the left, turns the triac on and sets a direction indicator to the dim direction and then returns to line 530 in FIG. 15. If the triac was found to be on, then the program turns it off and sets the direction indicator to bright and again returns to line 530 in FIG. 15.

In summary, the first time the control switch is found to be closed coming into the dimming loop, the net effect is to set a timer and then reverse the state of the triac, then return to line 530 for repeated cycles. The program then returns to line 532 and, since the control switch is now closed, drops to find that the "Control Switch" flag is now set. The program now moves to the right and decreases the local time-out by one unit and then asks if the time-out is completed. If not, it returns to line 530 to repeat the cycle. When the local time-out has expired, the program resets it to a short value and then checks to see if the lamp is fully on, i.e., at its maximum brightness level. If it is, the program sets the direction pointer in the dim direction and then asks if it is set in the bright direction.

Since it is not, the program decreases the brightness level and returns to line 530. The next time the program comes to this loop, if it finds the short time-out completed, it re-initializes the local time-out for the short value and again asks if the lamp is fully on. This time it is not because it has just been decremented one level, so the program then asks if the lamp is fully off. If it is not, it again asks if the direction arrow is in the bright direction, and since it is not, it decrements the brightness one more level. This routine continues until the program finds that the lamp is fully off, at which time it sets the direction indicator to bright. This time when the program asks if the direction is bright, the answer is yes and so the brightness control is incremented one level.

In summary, when the control switch 225 is initially depressed, a long time period is initialized, the state of the lamp is reversed, i.e., the lamp is turned either fully on or fully off, depending upon how it began, and the lamp slave unit 200 simply monitors the control switch waiting for the long time period to end. Once it is ended, if the switch is still closed, dimming or brightening will commence and will take place in steps occurring at a frequency which is determined by the short value of the local time-out register, the program reversing the direction of the brightness control each time the lamp reaches a fully on or fully off level.

If, at line 530, the program finds that a signal is being received from the central control unit 30, the program moves on line 534 to FIG. 17 to receive and store the message, decode it and check it for errors. The program then asks if the message contains the correct house code. If not, the command is ignored and the program returns to line 530. If the house code is correct, the program asks if the command is for a LIGHTS ON or a 1-12 OFF function. If it is, the program checks to see if its slave unit number is 13 through 16, since the LIGHTS ON and 1-12 OFF functions can only be executed by slave units numbered 1 through 12. Thus, if the slave unit is 13 through 16, it ignores the command. If not, it executes the command. This feature allows the use of code numbers 13 through 16 for control of appliances such as air conditioners, heaters or night lights which the user does not want to turn off accidentally. (Note that appliance slave units 300 will not respond to a LIGHTS ON command at all, regardless of the slave unit number.)

If the command is not a LIGHTS ON or a 1-12 OFF function, the program checks to see if the message contains the proper unit code for that slave unit. If not, it ignores the command; and if the unit code is correct, it asks to see if it is an ON command. If so, the program checks to see if the energy saver state is instructed and then executes the command accordingly. If the command was not ON, the program asks if it was OFF. If so, the command is executed and if not, the program asks if it was a PRESET command. If so, the program moves to the right, and checks to see if the lamp is either fully on or fully off. If it is, the program sets the brightness control to the preset level stored in the RAM of the slave unit microprocessor. If the lamp is not fully on or fully off, the program stores in the RAM the current brightness level.

If the command was not PRESET, the program asks if it was a BRIGHT command and, if so, increments the brightness control one level. If the command was a DIM command, the program decreases the brightness control one level. If it was neither a BRIGHT nor a DIM command, the program asks if it was a status request message and, if so, transmits the current on/off status of the slave unit.

The microprocessor programs of the slave units may be arranged so that one of the slave unit address numbers is set aside for special functions. Thus, for example, the slave units may be programmed so that when they are assigned slave unit number 16, they will respond to a single received command so as to turn on for a predetermined period of time and then automatically turn off.

This feature could be used, for example, for actuating an alarm clock radio, or an emergency alarm.

While the system 20 has been described as including a single central control unit 30, it will be understood that it could include additional central control units, so that the system could be controlled from more than one location. In this regard, there may also be provided a manual central control unit (not shown) which operates essentially as described above in connection with the MANUAL mode of the central control unit 30, but does not include any of the other modes.

While the lamp slave units 200 are specifically designed for controlling lamps and the appliance slave units 300 are specifically designed for controlling other types of appliances, in applications where the dimming function is not important, lamps may be plugged into appliance slave units 300.

Furthermore, while only three types of slave units have been specifically described herein, it will be understood that other slave units could be provided specifically tailored to particular types of appliances. Thus, for example, slave units designed for controlling appliances operating at 220-volt power, or slave units designed for interfacing with set-back thermostats, central heating and air conditioning units, hot water heaters and the like, could be provided.

From the foregoing, it can be seen that there has been provided an improved appliance control system which affords great flexibility, convenience and reliability.

We claim:

1. In a system including a central unit for controlling a remote lamp, a slave unit coupled to the remote lamp, and means providing communication between the central unit and the slave unit, the slave unit including light intensity control means variable among a plurality of intensity levels corresponding respectively to an OFF condition and a maximum intensity condition and a plurality of intermediate intensity conditions of the associated lamp, the central unit including means for transmitting to the slave unit a control signal for operating the light intensity control means, the improvement comprising: means in the central unit for transmitting to the slave unit a preset intensity signal; and processor means in the slave unit operating under stored program control; said processor means including means for sensing the intensity level of the light intensity control means; said processor means including means responsive to said preset intensity signal when said light intensity control means is in either the OFF level or the maximum intensity level for setting said light intensity control means to a predetermined intermediate intensity level.

2. The system of claim 1, wherein each of the central unit and the slave unit includes electrical plug pins for plugging the unit into an outlet socket of a domestic electrical power main which provides a communication link between the central unit and the slave unit.

3. The system of claim 2, wherein the central unit includes modulation means for pulse width modulating a carrier wave with signals to be transmitted to the slave unit and for coupling the modulated carrier wave directly to the power main, the slave unit including demodulation means coupled to the power main for receiving and demodulating signals transmitted from the central unit.

4. The system of claim 1, wherein the light intensity control means includes a triac phase control circuit coupled to said processor means, said processor means including means for generating gating signals for said triac phase control circuit and for controlling the timing of said gating signals.

5. The system of claim 1, wherein said processor means includes means responsive to said preset intensity signal when said light intensity control means is in an intermediate intensity level for storing that intermediate intensity level as the predetermined intermediate intensity level.

6. The system of claim 1, wherein the central unit includes keyboard input means for selectively controlling transmission of the control signal and the preset intensity signal.

7. The system of claim 1, wherein said system includes a plurality of slave units respectively coupled to a plurality of remote lamps, the central unit including means for selectively transmitting with each control signal and preset intensity signal an address code signal to indicate the slave unit for which the transmission is intended, each of the slave units including address means for rendering that slave unit responsive only to received signals which include a specific address code signal.

8. In a system including a central unit for controlling one or more remote lamps, slave units respectively coupled to the remote lamps, and means providing communication between the central unit and the slave units, each slave unit includng light intensity control means variable among a plurality of intensity levels corresponding respectively to an OFF condition and a maximum intensity condition and a plurality of intermediate intensity conditions of the associated lamp, the central unit including memory means for storing a plurality of user-entered event codes each including address information designating a particular slave unit and command information designating an ON or OFF function to be performed by the slave unit, means for automatically reading the event codes from the program memory and transmitting the event codes to the slave units at predetermined times, and means for selectively transmitting to a slave unit a control signal for operating the light intensity control means thereof, the improvement comprising: storage means in each slave unit for storing a selected intermediate light intensity level; processor means in the central unit operating under stored program control and operatively associated with the program memory means; input means coupled to said processor means for conditioning said processor means to an energy-saving state; said processor means including means responsive to the reading of an ON-function event from the memory when said processor means is in the energy-saving state thereof for transmitting with the corresponding event code a preset intensity signal; and processor means in each slave unit operating under stored program control and operatively associated with said storage means and said light intensity control means and responsive to reception of said preset intensity signal with an event code addressed to that unit for actuating said light intensity control means to the selected level stored in said storage means.

9. The system of claim 8, wherein said slave unit processor means further includes means for sensing the intensity level of the light intensity control means; and means responsive to said preset intensity signal when said light intensity control means is in an intermediate intensity level of storing that intermediate intensity level in said storage means as the selected intermediate intensity level.

10. The system of claim 8, wherein each of said slave unit processor means is responsive to reception of said preset intensity signal with an event code addressed to that unit for actuating said light intensity control means to a predetermined level if no selected level is stored in said storage means.

11. The system of claim 8, wherein the central unit includes means for transmitting to the slave units a group signal for simultaneously actuating a plurality of slave units.

12. The system of claim 11, wherein said group signal is an ON signal, said processor means of each of said plurality of slave units being responsive to said group ON signal for actuating said light intensity control means to the maximum intensity level thereof.

13. In a system including a central unit for controlling one or more remote devices, slave units respectively coupled to the remote devices, and means providing communication between the central unit and the slave units, the central unit including a processor operating under stored program control and having memory means for storing a plurality of user-entered event codes each including address information designating a particular slave unit and command information designating a function to be performed by the slave unit, and transmitting means for transmitting the event codes to the slave units, each slave unit having means for receiving the event codes and responding to those addressed to it for performing the designated function, the improvement comprising: review means in the central unit operatively associated with the processor for cooperation therewith selectively to read the even codes stored in the memory means and display indications thereof in an accelerated uninterrupted sequence; the processor including demonstration means coupled to the transmitting means for cooperation therewith automatically to transmit to the slave units each event code as its indication is displayed by said review means; thereby to verify proper performance of the functions by the slave units.

14. In a slave unit including electrical plug pins for plugging the unit into an outlet socket of a domestic electrical power main, means for connecting to the unit the power input of an electrical load having a load switch, and current control means coupled between the pins and the connecting means and having an enabled condition for permitting current to be supplied to the associated load and a disabled condition for preventing current from being supplied to the associated load, the improvement comprising: voltage sensing means coupled to the pins for sensing the voltage thereacross and providing either a load output signal indicating that the load switch is closed or a no-load output signal indicating that the load switch is open; processor means operating under stored program control and coupled to said voltage sensing means and to the current control means for repeatedly sampling the output signal of said voltage sensing means and storing each signal sample and comparing each signal sample with the previous signal sample; said processor means being responsive to a load signal sample immediately following a no-load signal sample for reversing the condition of the current control means.

15. The slave unit of claim 14, wherein the current control means includes a triac phase control circuit having a gate terminal coupled to said processor means.

16. The slave unit of claim 15, wherein the current control means further includes a relay coupled to said triac phase control circuit.

17. The slave unit of claim 14, and further including a control switch coupled to said processor means for cooperation therewith to control the condition of the current control means independently of the load switch.

18. The slave unit of claim 14, and further including indicating means coupled to said processor means for providing a positive indication when the load switch is closed.

19. In a system including a central unit for controlling a remote lamp, a slave unit coupled to the remote lamp, and means providing communication between the central unit and the slave unit, the slave unit including current control means for varying the energization of the associated lamp, the central unit including means for transmitting to the slave unit a control signal for operating the current control means, the improvement comprising: processor means in the slave unit operating under stored program control and coupled to the current control means; and switch means in the slave unit coupled to said processor means; said processor means being responsive to operation of said switch means for controlling the current control means independently of the central unit thereby to vary the intensity of the associated lamp.

20. In a system including a central unit for controlling a remote electrical load, a slave unit having terminals coupled to the remote load, and means providing communication between the central unit and the slave unit, the slave unit including current control means having an enabled condition for permitting current to be supplied to the associated load and a disabled condition for preventing current from being supplied to the associated load, the central unit including means for transmitting to the slave unit a control signal for operating the current control means, the improvement comprising: voltage sensing means in the slave unit coupled to the terminals for sensing the voltage thereacross and providing either a load output signal indicating that the load switch is closed or a no-load output signal indicating that the load switch is open; and processor means in the slave unit operating under stored program control and coupled to said voltage sensing means and to the current control means for repeatedly sampling the output signal of said voltage sensing means and storing each signal sample and comparing each signal sample with the previous signal sample; said processor means being responsive to a load signal sample immediately following a no-load signal sample for reversing the condition of the current control means.

21. In a central unit for controlling one or more remote devices via a communication link and including a processor operating under stored program control and having memory means for storing a plurality of user-entered event codes each including address information designating a particular remote device and command information designating a function to be performed by the remote device, and transmitting means for transmitting the event codes to the remote devices, the improvement comprising: review means operatively associated with the processor for cooperation therewith selectively to read the event codes stored in the memory means and display indications thereof in an accelerated uninterrupted sequence; the processor including demonstration means coupled to the transmitting means for cooperation therewith automatically to transmit to the remote devices each event code as its indication is displayed by said review means; thereby to verify proper performance of the functions by the remote devices.

22. The central unit of claim 21, wherein each of the event codes includes time information designating the predetermined time at which the event is to occur, the processor including timing means for maintaining current time-of-day and day-of-the-week information and comparing it with the time information in the event codes for cooperation with the transmitting means automatically to transmit the event codes at the predetermined times.

23. The central unit of claim 22, wherein said review means includes sequence control means selectively operable to first and second states, the sequence control means in the first state thereof causing the event codes to be read according to the remote device for which they are intended so that all the event codes intended for one remote device will be read before proceeding to the event codes for the next remote device, said sequence control means in the second state thereof causing the event codes to be read according to day of the week so that each of the event codes scheduled for one day of the week will be read before proceeding to the event codes for the next day of the week.

24. The central unit of claim 21, and further including keyboard input means for storing the event codes in the memory and for actuating said review means.

25. The central unit of claim 24, wherein said input means includes control means operatively associated with the processor for actuating and deactuating said demonstration means.

26. The central unit of claim 25, wherein said control means is operative for actuating and deactuating said demonstration means only when said review means is actuated.

27. The central unit of claim 25, and further including indicating means for indicating whether or not said review means and said demonstration means are actuated.

28. In a slave unit including electrical plug pins for plugging the unit into an outlet socket of a domestic electrical power main, means for connecting the power input of an electrical lamp to the unit and current control means coupled between the pins and the connecting means to control the energization of the associated lamp, the improvement comprising: processor means operating under stored program control and coupled to the current control means; and switch means coupled to said processor means; said processor means being responsive to operation of said switch means for operating the current control means to vary the current supplied to said connecting means thereby to vary the intensity of the associated lamp.

29. The slave unit of claim 28, wherein said processor means operates said current control means only while said switch means is closed.

30. The slave unit of claim 29, wherein said processor means includes timing means for delaying actuation of said current control means until said switch means has been held closed for a predetermined period of time.

31. The slave unit of claim 28, wherein said processor means is operative for cooperation with the current control means for varying the intensity of the associated lamp among an OFF condition and a maximum intensity condition and a plurality of intermediate intensity conditions.

32. The slave unit of claim 31, wherein said processor means is responsive to continued closure of said switch means for repeatedly varying the intensity of the associated lamp among the several conditions from the OFF condition to the maximum intensity condition and back again.

33. The slave unit of claim 28, wherein the light intensity control means includes a triac phase control circuit coupled to said processor means, said processor means including means for generating gating signals for said triac phase control circuit and for controlling the timing of said gating signals.

* * * * *